United States Patent [19]
Wood

[11] Patent Number: 5,619,873
[45] Date of Patent: Apr. 15, 1997

[54] ANTI-THEFT STEERING WHEEL LOCKING DEVICE

[76] Inventor: Thomas W. Wood, 121 Kimberly Dr., American Canyon, Calif. 94589

[21] Appl. No.: 666,057

[22] Filed: Jun. 19, 1996

Related U.S. Application Data

[63] Continuation of Ser. No. 313,346, Sep. 27, 1994, abandoned.

[51] Int. Cl.$^6$ .................................................. B60R 25/02
[52] U.S. Cl. ........................ 70/209; 70/167; 70/226; 70/237
[58] Field of Search ................... 70/207, 209, 211, 70/212, 225, 226, 237, 238, 259, 260, 158–173

[56] References Cited

U.S. PATENT DOCUMENTS

| | | | |
|---|---|---|---|
| 1,154,389 | 9/1915 | Fogalsang | 70/212 |
| 1,329,913 | 2/1920 | McGuire | 70/209 |
| 1,368,054 | 2/1921 | Recher | 70/212 |
| 1,395,532 | 11/1921 | Tilden | 70/212 |
| 1,921,435 | 8/1933 | Stone | 70/38 B |
| 3,982,602 | 9/1976 | Gorman | 180/114 |
| 4,505,140 | 3/1985 | Solow | 70/18 X |
| 4,738,127 | 4/1988 | Johnson | 70/209 |
| 5,031,429 | 7/1991 | Wang | 70/209 |
| 5,055,823 | 10/1991 | Fuller | 70/209 X |
| 5,353,614 | 10/1994 | Anderson | 70/209 |
| 5,404,735 | 4/1995 | Hsieh | 70/DIG. 49 X |
| 5,415,018 | 5/1995 | Ferrante | 70/209 |
| 5,450,736 | 9/1995 | Volkmar | 70/238 X |

FOREIGN PATENT DOCUMENTS

| | | | |
|---|---|---|---|
| 919367 | 3/1947 | France | 70/212 |
| 2501134 | 9/1982 | France | 70/237 |
| 2520313 | 7/1983 | France | 70/237 |
| 361686 | 11/1931 | United Kingdom | 70/207 |

*Primary Examiner*—Lloyd A. Gall

[57] ABSTRACT

A portable housing device for protectively enclosing the steering wheel and driver's side airbag of an automotive vehicle to prevent theft. The device includes a plurality of sections sharing a common axis member. One section is fixedly connected to the axis member, which serves as a pivot point around which each remaining section may be rotated. An integral keyless locking mechanism is included to automatically secure the device once it has been installed on a steering wheel by fixedly connecting each rotatable section to the axis member. The size of the device is substantially reduced for storage purposes by selectively varying the dimensions of each section and by locating the axis member so that each rotatable section is pivotable in a concentric arc around it to a single nested position including the fixedly connected section. Certain embodiments include an interference bar member, an electronic alarm system, or both, to enhance the anti-theft capability of the device.

12 Claims, 18 Drawing Sheets

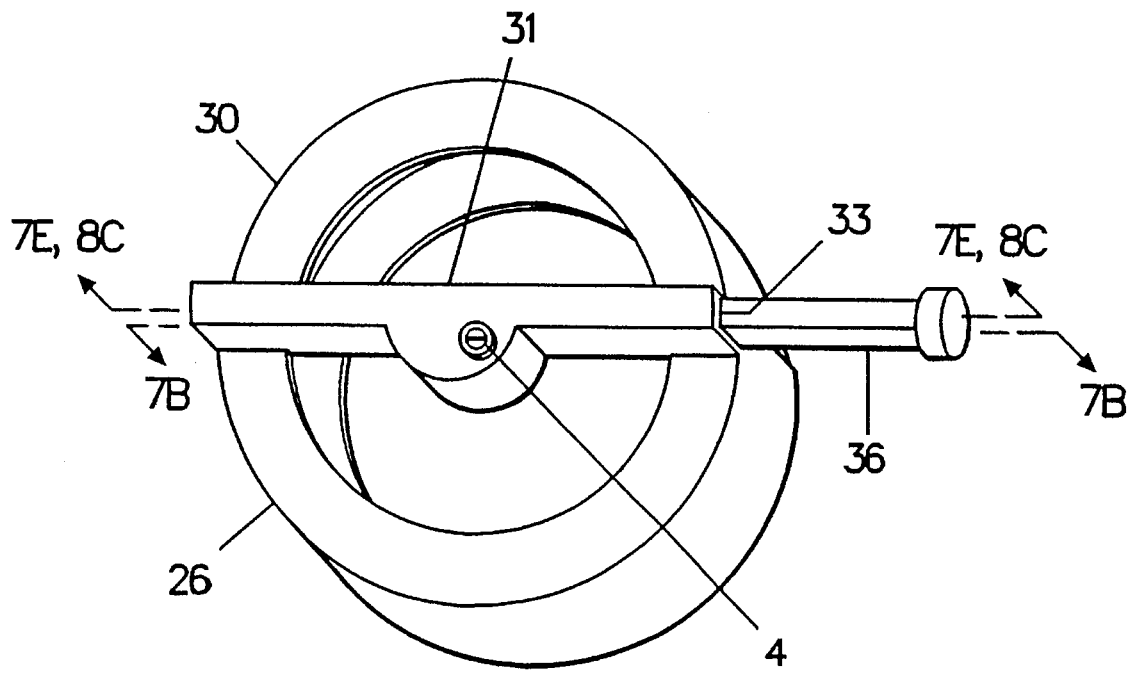
FIG. 7A
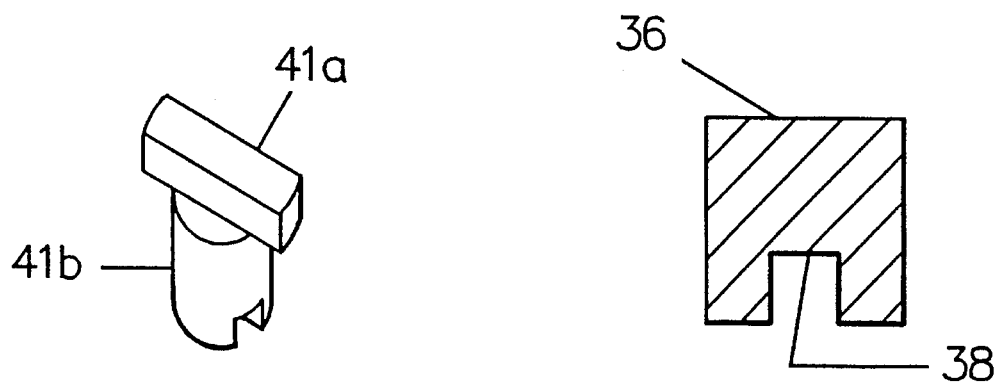
FIG. 7C
FIG. 7D

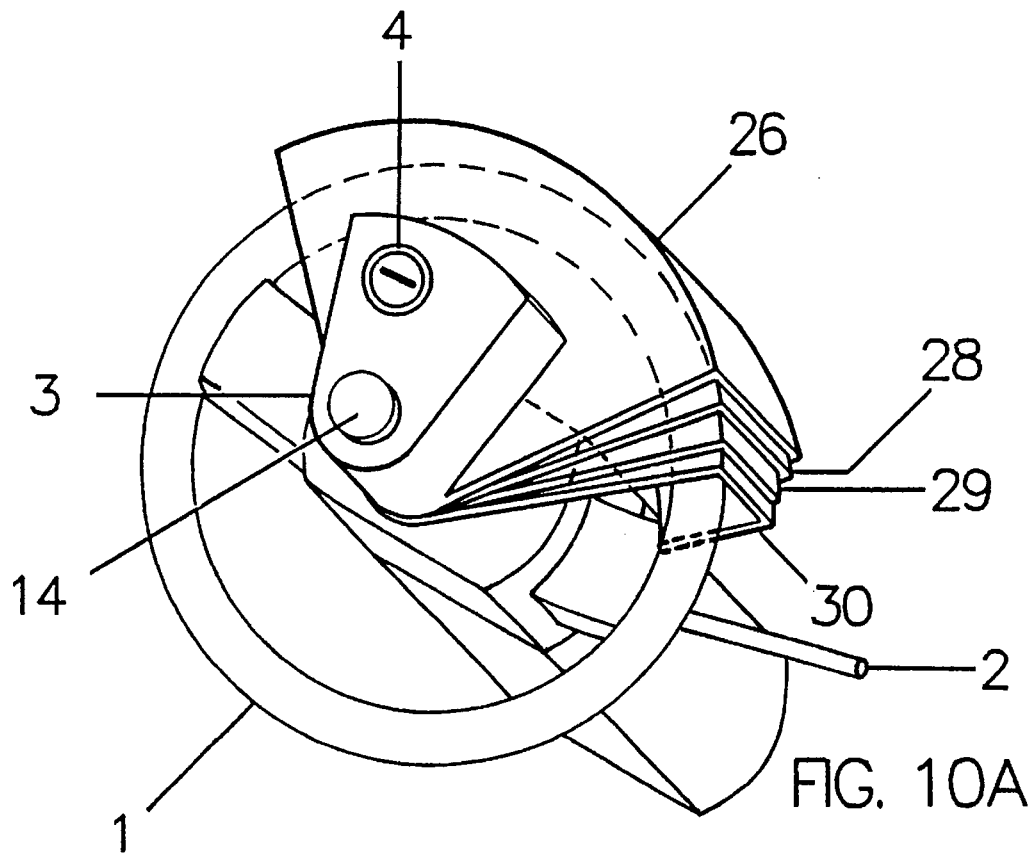
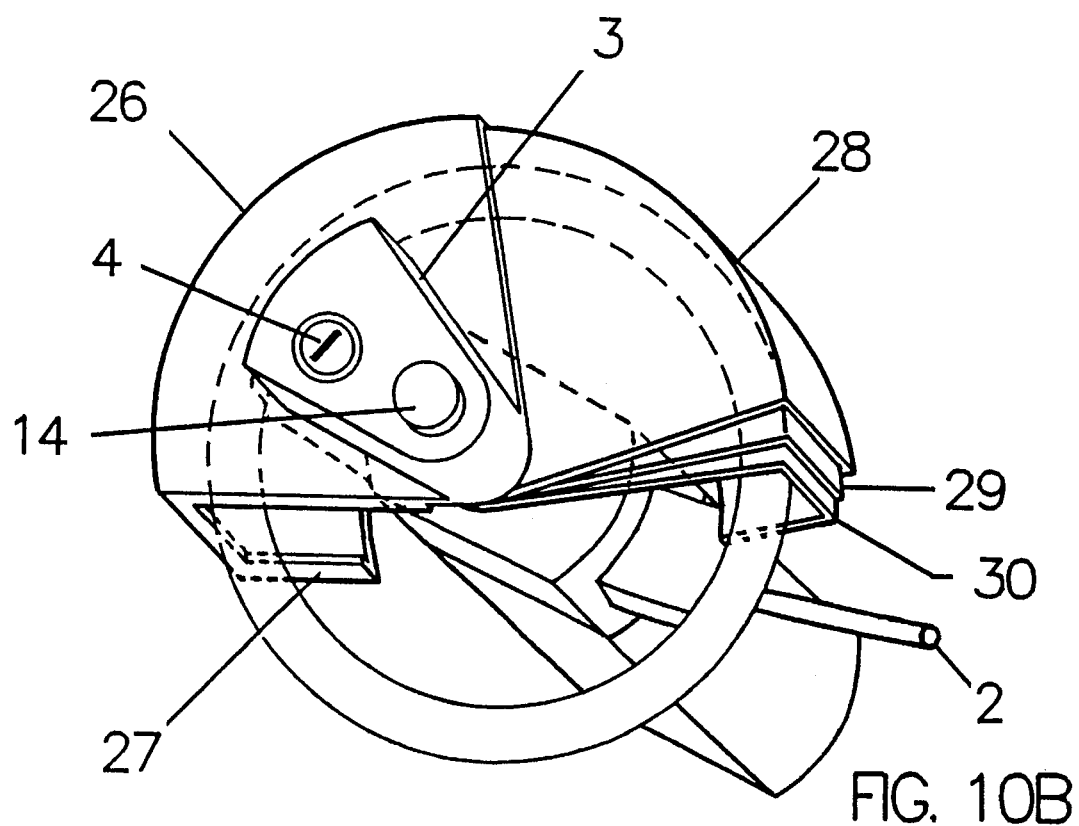

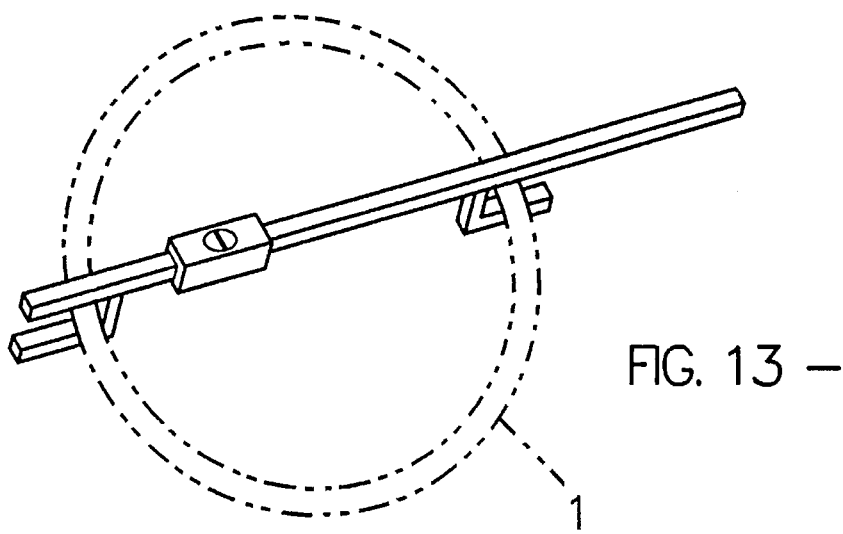
FIG. 13 — PRIOR ART
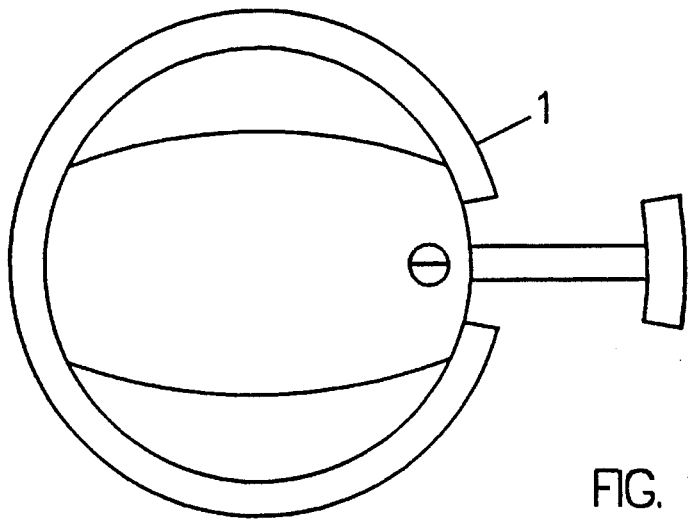
FIG. 14 — PRIOR ART
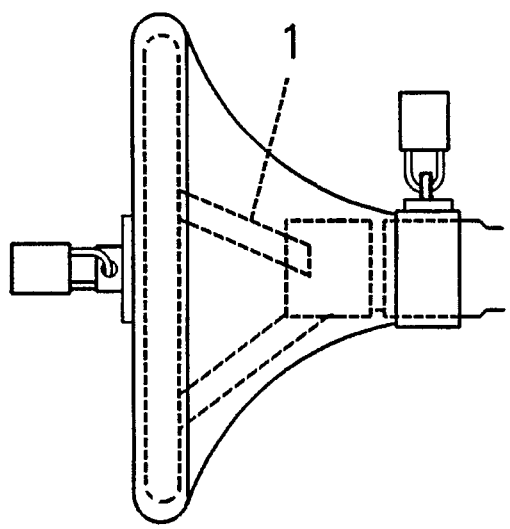
FIG. 15 — PRIOR ART

ANTI-THEFT STEERING WHEEL LOCKING DEVICE

This is a continuation of application Ser. No. 08/313,346 filed on Sep. 27, 1994, now abandoned.

BACKGROUND—FIELD OF INVENTION

This invention relates to anti-theft protection for parked motor vehicles, especially automobiles, by preventing useable access to the steering wheel.

BACKGROUND—DESCRIPTION OF PRIOR ART

Although a wide variety of anti-theft devices have been previously invented for automobiles, automobile theft remains a world-wide problem, resulting in billions of dollars in losses annually. Furthermore, new types of theft are emerging, including the theft of expensive driver's side air-bag modules for which no effective counter-measures presently exist.

Current anti-theft devices for automobiles include various alarm systems—which rely upon drawing unwanted attention to criminal activities—and mechanisms which present a physical constraint to theft, including steering wheel locks. Alarm systems are losing effectiveness as consumers become increasingly used to and annoyed by false alarms and hence more likely to ignore real criminal events. While steering wheel locks avoid the foibles of human intervention by presenting a physical impediment to theft, the prior art devices suffer from design weaknesses which can be readily exploited by thieves, or which limit the wide-spread application of the device, or both:

(1) Ignition Locks. The steering wheel is locked when the ignition key is removed by driving a locking bolt into a shallow trough in the steering wheel axle to prevent the steering wheel from turning. Experience has shown that such locking mechanisms readily fail under force. Ignition locks also offer no visible deterrence to theft and do not protect against the theft of driver's side air-bag modules housed in the steering wheel hub.

(2) Extended Interference Bar Devices (FIG. 13). The steering wheel is prevented from turning freely by attaching an extended bar member to it using hooks or clasps. A variation of this device attaches the bar member to the steering wheel at one end and the brake or accelerator pedal at the other end. Such devices can be easily overcome by using a hacksaw or bolt cutter to cut through the steering wheel rim, after which the device can be forced off with the steering wheel usually remaining in a driveable condition. Most such devices are ineffective against the theft of driver's side air-bag modules.

(3) Removable Steering Wheels. A locking mechanism allows the steering wheel to be removed when the vehicle is not in use. The widespread after-market installation of such devices is limited by the installation expense associated with reconfiguring the steering wheel-to-steering wheel axle connection to accept a removable member. Because it may be impractical for a person using such a device to carry the steering wheel with them, there is also the danger that the steering wheel, after being removed, will be stored in the vehicle where a thief may find and reattach it. Such devices are incompatible for after-market installation on vehicles containing driver's side air-bag modules and undesirable for installation on manufactured vehicles containing air-bag modules because the highly sensitive link between the steering wheel and the steering wheel axle must be broken.

(4) Integral Interference Bar Steering Wheels (FIG. 14). A key-operated locking mechanism allows a bar member permanently housed within the steering wheel hub to be extended from it to keep the steering wheel from turning freely. Because this device modifies the steering wheel itself, it is restrictive for widespread after-market application. Such devices also offer no protection against the theft of steering wheel air-bag modules.

(5) Truncated Cone Steering Wheel Housing (FIG. 15). A hinged housing in the shape of a truncated cone completely encloses the steering wheel and engages with the steering column using a snug fitting engagement collar. Although this device offers excellent potential anti-theft protection for both the vehicle and any driver's side air-bag module installed on it, it suffers from the following limitations which substantially detract from its success and desirability for widespread application:

a) because the housing is designed to extend from the steering wheel rim to a snug fitting engagement with the steering column, any control wands present in the steering wheel area for the vehicle's turn signals, lights, windshield wipers and/or automatic transmission will interfere with the placement and closure of the device and may make installing it impossible;

b) the wide variety in size and shape used for steering wheel column housings makes providing a universally snug-fitting engagement collar impossible and also works against the truncated cone shape of the device itself since the steering wheel rim is normally circular in shape whereas the steering wheel hub and steering column housing are often elliptical or even rectangular in shape;

c) although the device must be relatively large in order to completely enclose the steering wheel, its size cannot be reduced when the device is not in use, making it both difficult to store and to install the device inside the comparatively cramped passenger compartment of an automobile;

d) because the device does not include an integral locking mechanism, the consumer must add 2 external (pad-)locks, which further complicates its installation; and e) the hinge controlling the closure of the device is exposed along its entire length, presenting ample area for a thief to pry into or otherwise damage the hinge in order to open the device.

OBJECTS AND ADVANTAGES OF THE PRESENT INVENTION

Because there continues to be a need for an effective, compactly storable, and easily installed steering wheel lock which is not being met by prior art inventions, the inventor has designed a portable steering wheel locking device having the following objects and advantages:

(1) to provide an apparatus which prevents useable access to the steering wheel when the device is installed, thereby rendering the vehicle undriveable;

(2) to provide an apparatus which—depending upon the steering wheel configuration of a given vehicle—either cannot be removed by a thief or cannot be removed without destroying or significantly impairing the usability of the steering wheel, thereby rendering the vehicle undriveable;

(3) to provide an apparatus which hides and/or makes it impossible to remove any driver's side air-bag module which may be present while the device is installed on the vehicle;

(4) to provide an apparatus which is readily visible from the exterior of the vehicle when installed in order to present a visible deterrence to theft;

(5) to provide an apparatus which can be made compact when not in use for easy storage inside the passenger compartment of a vehicle;

(6) to provide an apparatus which is easy for the consumer to install, including the provision of an integral, automatic self-locking mechanism which requires no special effort by the user to activate;

(7) to provide an apparatus which may be manufactured in one, or at most several, sizes which are universally suitable for installation on all existing and new automobiles and which is readily interchangeable between the vehicles which may be owned by a given consumer and any future vehicles said consumer may purchase;

(8) to provide an apparatus which can be readily configured—without changing its fundamental physical embodiment or operation—to include an extendable interference bar member if desired for particular applications; and (9) to provide an apparatus which can be readily configured—without changing its fundamental physical embodiment or operation—to include an integrally housed and powered anti-theft alarm system to further enhance its theft deterrence capabilities.

Additional objects and advantages of the present invention will become apparent from a consideration of the drawings and ensuing description included herein.

BRIEF DESCRIPTION OF DRAWINGS

The invention will be better understood by reference to the accompanying drawings, which show several particular, but not the only possible, embodiments of the device. Closely related figures share the same number but have different alphabetic suffixes. The use of the words "the device" shall be understood to refer to only the particular illustrated embodiment, and shall not be limiting in terms of non-illustrated embodiments, to the extent that such embodiments embrace the fundamental concepts of the invention generally described in the "Abstract", "Claims", and "Summary of the Invention" included herein.

Drawing Figures

FIG. 7A is an isometric anterior view of a two section device configured to include an extendable interference bar member.

FIG. 7C is a detail view of the central axis member associated with extendable interference bar member configurations.

FIG. 7D is an end sectional view of the extendable interference bar member.

FIGS. 10A to 10D are isometric anterior views of a four section device undergoing installation on a steering wheel.

FIG. 13 is an Extended Interference Bar prior art device.

FIG. 14 is an Integral Interference Bar Steering Wheel prior art device.

FIG. 15 is a Truncated Cone Steering Wheel Housing prior art device.

REFERENCE NUMERALS USED IN DRAWINGS (Matching screw or bolt holes and corresponding screws or bolts have identical numbers except where indicated)

Figure 1A:
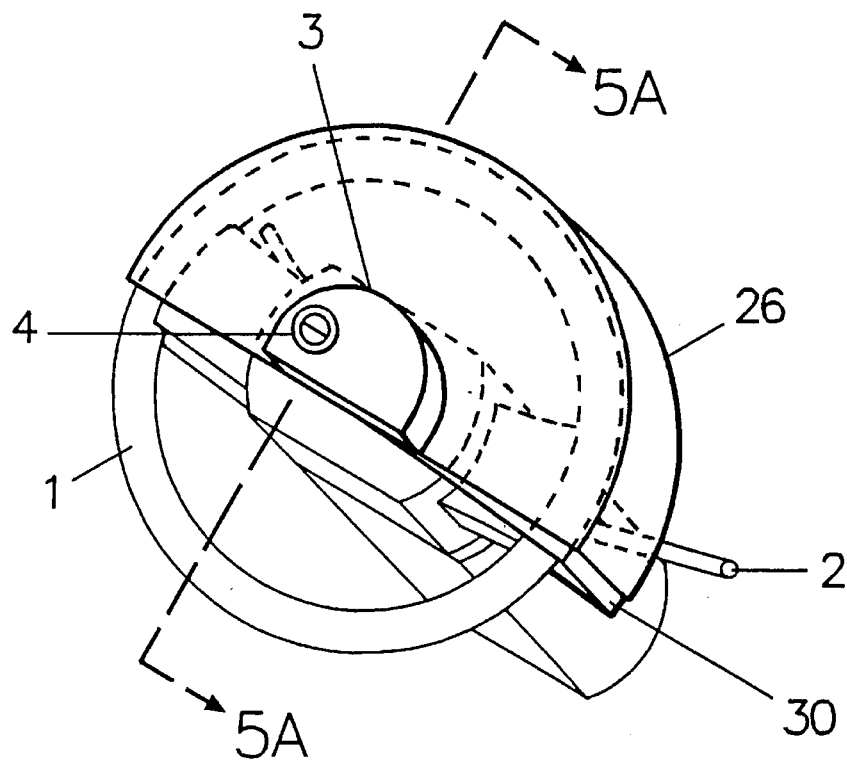
FIGS. 1A and 1B are isometric anterior views of a two section device undergoing installation on a steering wheel.

| | |
|---|---|
| 1 - Steering Wheel (including rim, fibs, hub) | 28 - Section 28 |
| 2 - Control Wands | 29 - Section 29 |
| 3 - Lock Casing | 30 - Section 30 |
| 4 - Cylinder lock | 31 - Guide Tube |
| 5 - Notched Cylinder lock Opening | 32 - Lock Mechanism Cavity Area |
| 6 - Cylinder lock Installation Nut | 33 - Interference Bar Insertion Aperture |
| | 34 - Set Screw Access Hole (Optional) |

-continued

| | |
|---|---|
| 7 - Cam Arm | 35 - Anti-Rotation Tongue |
| 8 - Cam Arm Washer | 36 - Extendable Interference Bar Member |
| 9 - Cam Arm Screw | 37 - Free Rotation Groove |
| 10 - Spring Member | 38 - Anti-Rotation Groove |
| 11 - Locking Bolt | 39 - Set Screw Hole (Optional) |
| 12 - Locking Bolt Channel | 40 - Handle |
| 13 - Locking Bolt Core | 41 - Central Axis Member |
| 13a - Core Attachment Screws | 41a - Rectangular Head |
| 14 - Central Axis Member | 41b - Female Shaft |
| 14a - Circular Head | 41c - Screw Hole |
| 14b - Female Shaft | 42 - Set Screw (Optional) |
| 14c - Screw Hole | 43 - Two Piece Extendable Interference Bar Member |
| 15 - Locking Bolt Insertion Hole | |
| 16 - Central Axis Opening (Section 26) | 43a - Outer (Tubular) Bar |
| 17 - Male Extension | 43a1 - Extension Screw Course |
| 17a - Screw Hole | 43b - Inner Bar |
| 18 - Anti-Binding Washer | 43b1 - Extension Screw |
| 19 - Axis Screw | 44 - Alarm Module |
| 20 - Lock Casing Screws and Screw Holes | 45 - On/Off Switch |
| 21 - Lock Casing Lip | 46 - 9 Volt Power Source (Battery Case) |
| 22 - Lock Casing Coverplate Recess | 47 - Battery Case Coverplate |
| 23 - Lock Casing Coverplate | 48 - Battery Case Coverplate Screws and Screw Holes |
| 24 - Lock Casing Coverplate Screws and Screw Holes | |
| | 49 - Central Axis Opening (Lock Casing 3) |
| 25 - Tubular Hub Segment | 50 - Locking Bolt Insertion Passages |
| 26 - Section 26 | |
| 27 - Leading Edge of Section 26 | |

SUMMARY OF THE INVENTION

In accordance with the preferred embodiment of the invention, a housing is provided having generally circular anterior and posterior ends and symmetrical sides which encloses the entire front, back, and outer edges of the steering wheel rim when the device is installed in the locked position on a vehicle. Although the radially inward facing edge of the steering wheel rim is not enclosed by the walls of the device, it is made invulnerable to attack by saws or similar tools which have been used by car thieves to thwart prior art devices because the location and narrow size of the opening separating the anterior and posterior ends of the housing prevents an effective sawing motion for hand tools and the insertion of power tools. Because the steering wheel rim is made essentially invulnerable to attack by enclosure within the housing, the only unauthorized way to remove an appropriately hardened anti-theft device made according to the invention from a vehicle is by detaching the entire steering wheel rim from the ribs and hub of the steering wheel, which effectively disables the vehicle since adequate steering leverage is lost.

Figure 1B:
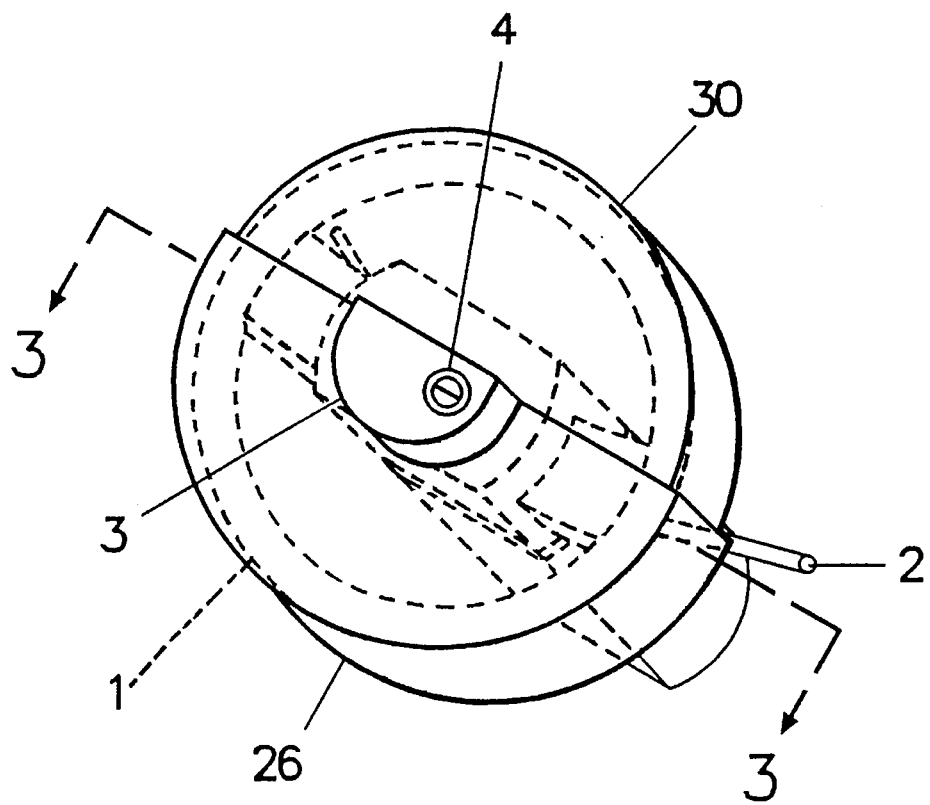
Figure 2:
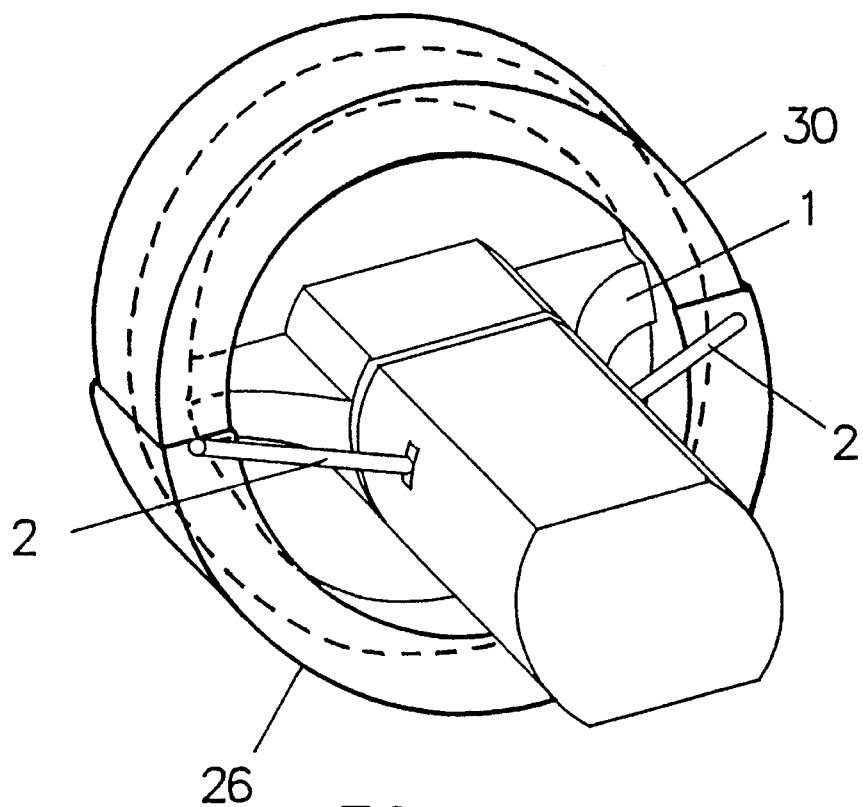
FIG. 2 is an isometric posterior view of a two section device fully installed on a steering wheel.
Figure 3:
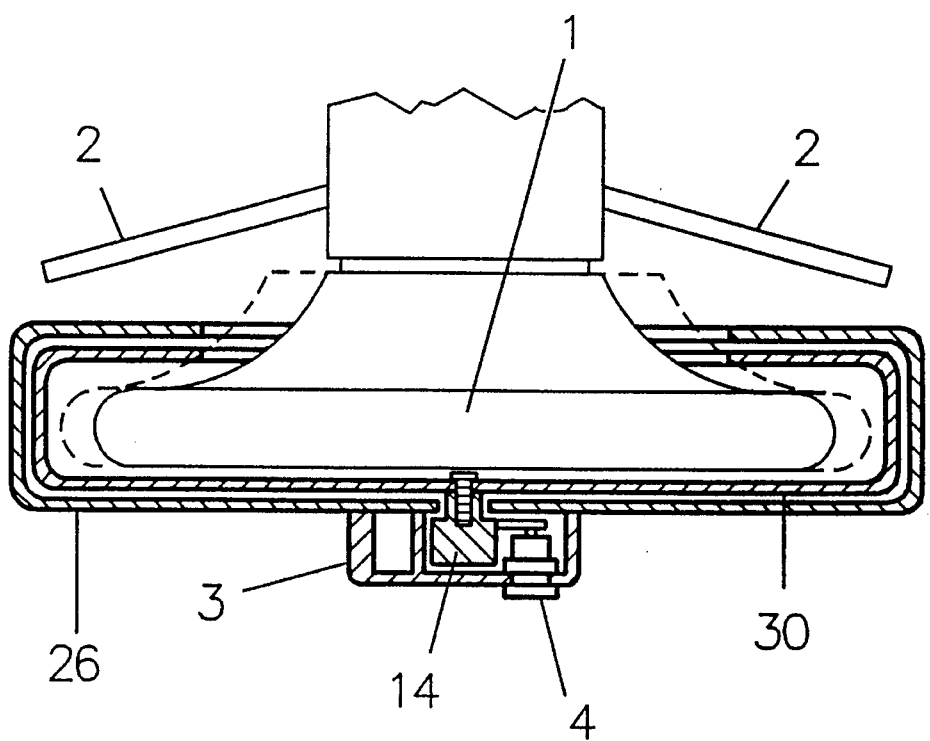
FIG. 3 is a dashboard down facing sectional view of a two section device installed on a steering wheel.

Depending upon the particular embodiment of the invention, the anterior end of the housing—which encloses the front edge of the steering wheel rim—may be completely closed as shown by FIG. 1B or selectively perforated as shown by FIG. 7A when the device is locked, with both configurations preventing the removal of any driver's side air-bag module installed on the vehicle. As shown by FIG. 2, the posterior end of the housing—which encloses the back edge of the steering wheel rim—remains partially open at its center in all embodiments when the device is locked to allow the steering wheel hub and steering column to pass through the device without impediment. As shown in FIG. 3, the depth of the housing is proportioned so that the device encloses the outer edge of the steering wheel rim without extending beyond the clearance gap customarily allowed for hand movement between the steering wheel rim and any turn signal or other control wands which may be present on a given vehicle. The dimensions of the housing are particularly established so that the device may be rotated freely without causing the steering wheel protectively enclosed inside it to turn.

Figure 4:
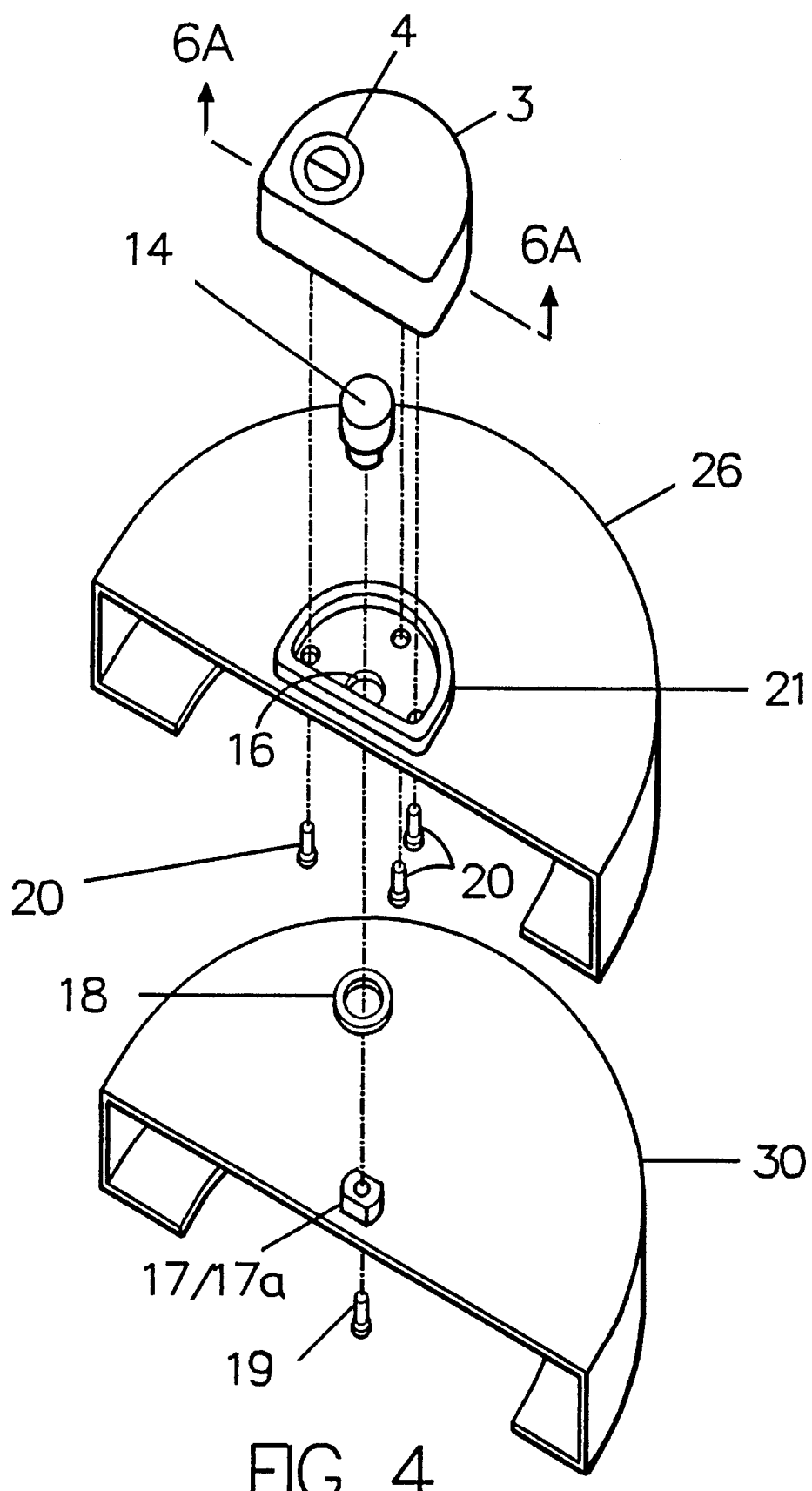
FIG. 4 is an exploded anterior isometric view of a two section device.

As shown in FIG. 4, the device is formed of two or more sections connected by a common axis member. One section is fixedly connected to the axis member, which serves as a pivot point around which each remaining section may be rotated. The sections have the same general contour, with each section describing a sector of the anterior and posterior ends of the device and a portion of the sides of the device.

Figure 9:
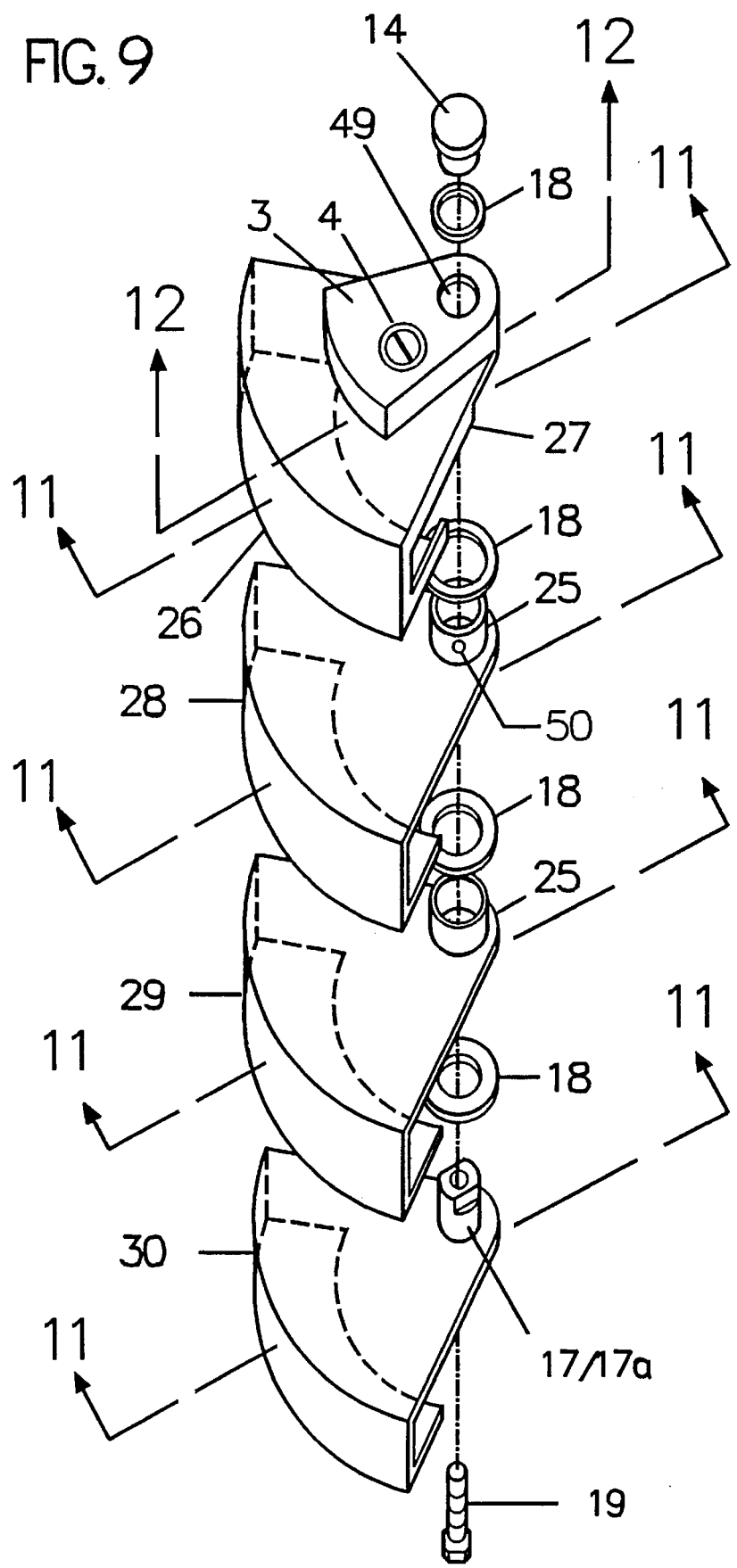
FIG. 9 is an exploded isometric view of a four section device.
Figure 10C:
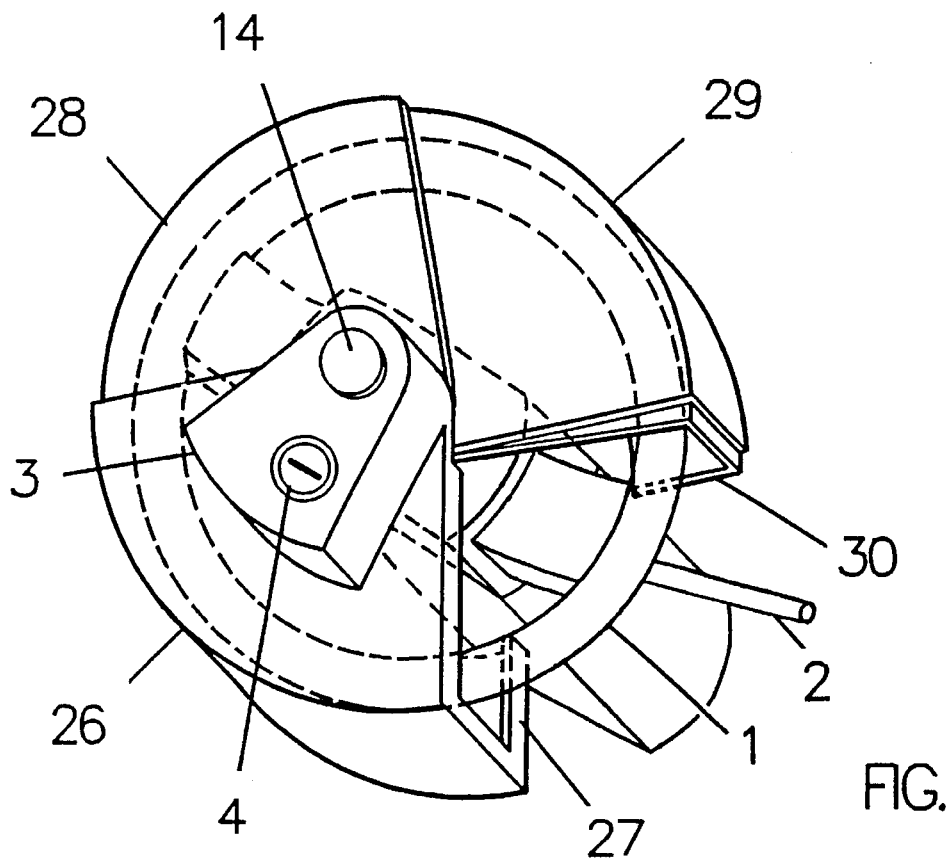

FIG. 9 shows a four section device made according to the invention and demonstrates the typical configuration for embodiments containing two or more rotatable sections. As shown by FIGS. 1A, 1B and 3 for a two section embodiment, and by FIGS. 10A to 10D for a four section embodiment, each section has particularly different dimensions than any other section so that each rotatable section is pivotable in a concentric arc on the axis member around the fixedly connected section and any other rotatable section included in the particular embodiment. This allows the size of the device to be significantly reduced for storage purposes, as best shown in FIGS. 1A and 10A, which demonstrate the pre-installation size of two and four section embodiments, respectively.

A self-locking mechanism is provided to automatically secure the device without special effort when the housing has been installed in a fully closed position on a steering wheel. The self-locking mechanism is encased within a protective casing which also protectively encloses the parts forming the rotational axis of the device. As shown by FIGS. 7A and 8A respectively, the lock mechanism casing can readily be configured to include an integral extendable interference bar member or an anti-theft alarm system to further enhance the theft deterrence capabilities of the device without altering its fundamental operation and embodiment.

Because ergonomic constraints and industry customs substantially limit standard (vs. novelty) steering wheel diameters and steering wheel rim-to-control wand gaps which have been established for automobiles, and because the device is meant to loosely enclose rather than tightly engage with a given steering wheel, the device can be manufactured in one, or at most several, universal size(s), dimensioned to fit all steering wheel diameters falling within a predetermined range. Furthermore, the device offers substantial anti-theft protection since: a) the vehicle's steering wheel and any air bag module installed on it cannot be useably accessed when the device is installed; and, b) the only unauthorized way to remove an appropriately hardened embodiment of the device from a steering wheel is by detaching the entire steering wheel rim from the vehicle, which leaves only the steering wheel hub and ribs for steering purposes and effectively disables the vehicle since adequate steering leverage is lost.

Because the device must possess high tensile strength, impact resistance and hardness characteristics in order to resist the attempts of thieves to thwart it, the use of die cast or drop forged steel or metal alloys is recommended in its construction. In order to minimize the weight or materials cost of the device, it may be selectively hardened at critical sawing points only, including the lock casing, the portions immediately enclosing the steering wheel rim, and the extendable interference bar member.

DETAILED DESCRIPTIONS OF SEVERAL PREFERRED EMBODIMENTS

Referring again to the drawings, several preferred embodiments of the invention are shown, including two and four section configurations and configurations with integral extendable interference bars and anti-theft alarm systems. It shall be expressly understood that the showings are meant only for the purpose of illustrating the general construction and operation of the invention and not for the purpose of limiting the scope of same since it will be obvious to persons familiar in the art that further embodiments are possible within the fundamental concept of the invention.

Two Section Embodiments

General Construction

FIG. 4 shows an exploded isometric view of an anti-theft device according to the present invention. In this particular embodiment, the device is composed of two sections 26 and 30 having the same general contour, each of which describes a sector of the generally circular opposite ends of the housing and a portion of the sides of the housing so that the entire 360 degree circumference of the steering wheel rim and at least a portion of the steering wheel ribs and hub are protectively enclosed when the device is installed in a locked position on a vehicle, as best seen in FIG. 1B. As mentioned previously, two or more such sections can be used to construct the device depending upon the storable size for the device sought. By way of example, a four section embodiment of the device is shown in FIG. 9, FIGS. 10A to 10D, FIG. 11 and FIGS. 12A to 12D and explained under "Four Section Embodiments" below.

As best seen in FIG. 3, the dimensions of sections 26 and 30 are selectively varied, so that section 30 may be rotated to a position within the cross sectional area described by section 26. This rotational arrangement allows section 30 to nest inside section 26 when the device is not in use, which substantially decreases its size for storage purposes, as best seen in FIG. 1A. As generally seen in FIGS. 1B and 2, the sectors described by sections 26 and 30 are also particularly dimensioned so that the adjacent edges of each section overlap along their entire contour to prevent a thief from inserting prying or sawing tools into or through the device and to create a rigid composite structure when the device is installed in a closed and locked position on a steering wheel.

Figure 5A:
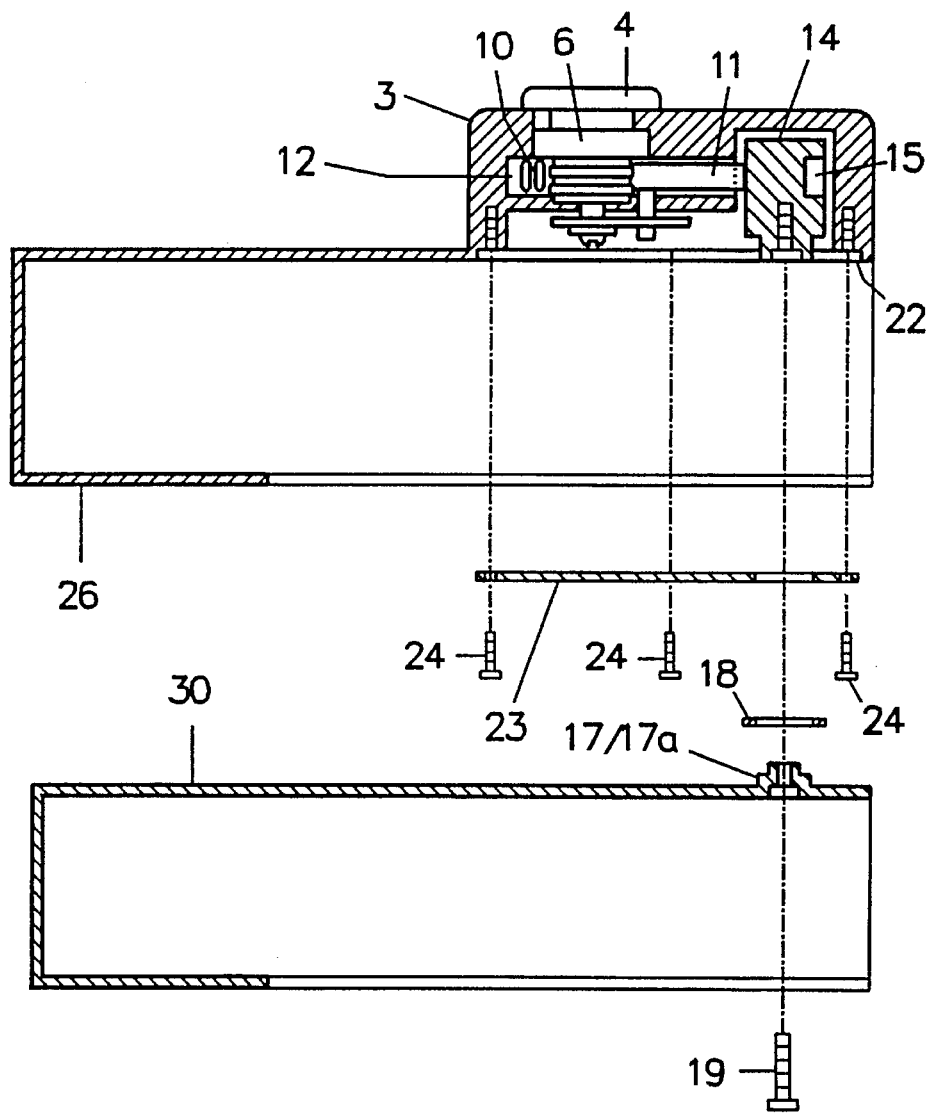
FIG. 5A is a side sectional view of the integral locking mechanism of a two section device.
Figure 5B:
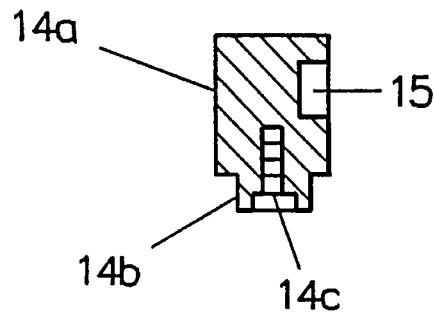
FIG. 5B is a detail view of the central axis member of a two section device.

As best seen in FIGS. 3 and 5A, sections 26 and 30 are joined together in a rotatable configuration using central axis member 14, which includes a circular head 14a, a female shaft 14b, a screw hole 14c, and a locking bolt insertion hole 15, as best seen in FIG. 5B. As best seen in FIG. 4, central axis opening 16 included at the center point of section 26 allows the female shaft 14b of central axis member 14 to be inserted through it, where it is permanently attached to a mated male extension 17 included at the center point of section 30 by inserting axis screw 19 through screw hole 17a of male extension 17 and screw hole 14c of central axis member 14. As best seen in FIGS. 4 and 5A, washer 18 is included on male extension 17 between the adjacent surfaces of sections 26 and 30 to help minimize any binding during rotational movement. Because the diameter of circular head 14a of central axis member 14 is larger than the diameter of central axis opening 16 of section 26, sections 26 and 30 cannot be pulled apart, although each section may be freely rotated around the other.

Figure 5C:
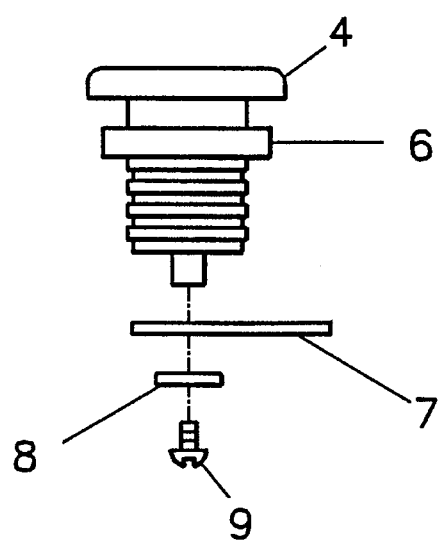
FIG. 5C is a detail view of the cylinder lock/cam arm configuration of the integral locking mechanism of the device.
Figure 6A:
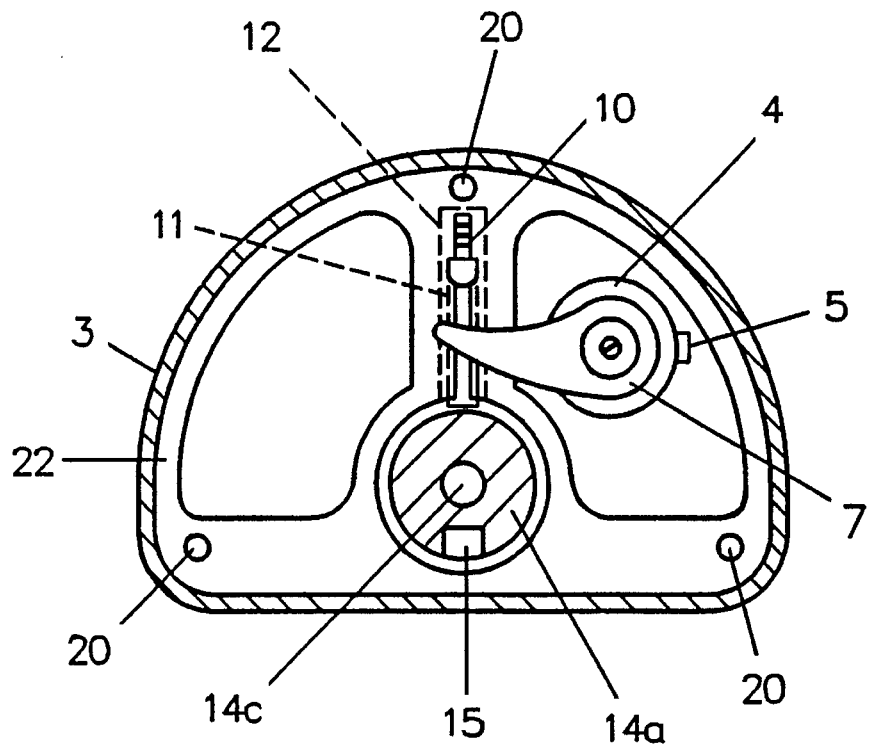
FIGS. 6A and 6B are posterior sectional views of the integral locking mechanism of a two section device.
Figure 6B:
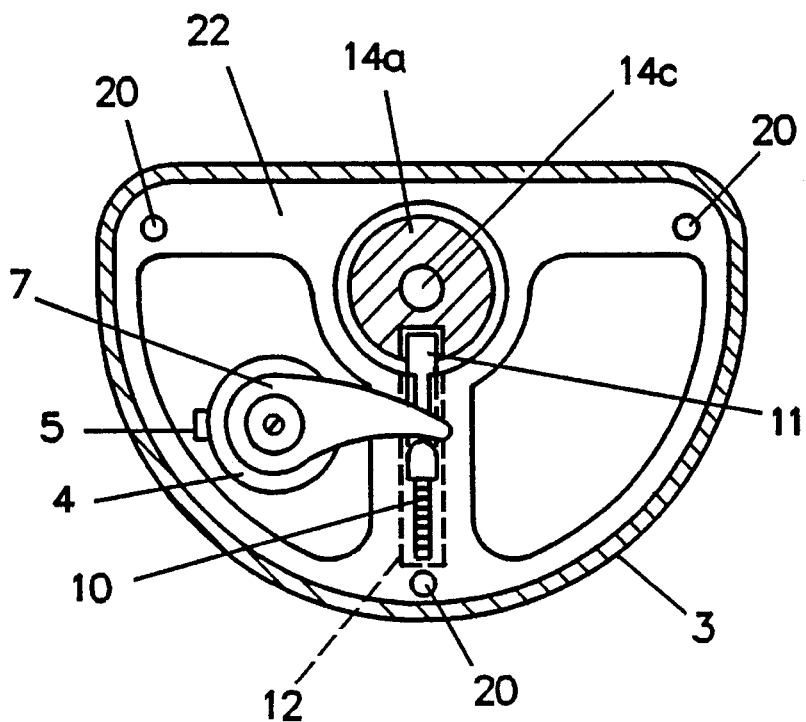

As best seen in FIG. 5A and FIGS. 6A and 6B, the device includes an automatic self-locking mechanism for user convenience. This mechanism comprises lock casing 3, which contains cylinder lock 4, cam arm 7, spring member 10, locking bolt 11 and locking bolt channel 12, and which encloses central axis member 14 containing locking bolt insertion hole 15 securely within its walls. Cylinder lock 4 includes a generally rectangular projection along one side so that it may be fixedly inserted into lock casing 3 through notched opening 5, and a threaded portion so that it may be tightly joined to lock casing 3 using installation nut 6. As best seen in FIG. 5C, cam arm 7 is attached to the rotatable extension of cylinder lock 4 using washer 8 and screw 9, and is configured to engage with an extended portion provided for this purpose of locking bolt 11 so that locking bolt 11 slides within locking bolt channel 12 when cam arm 7 is rotated after inserting a valid key into cylinder lock 4, as best seen in FIG. 6B. In addition to locking bolt 11, locking bolt channel 12 contains spring member 10, which is held under compression by central axis member 14 when the device is in the open or unlocked position. As best seen in FIGS. 6A and 6B, an elongated through-passage forming part of locking bolt channel 12 allows the extended portion of locking bolt 11 to pass through it, where it is engaged by cam arm 7 when it is desired to unlock the device.

As best seen in FIG. 4, lock casing 3 may be permanently attached to section 26 using lock casing screws 20. Lock casing lip 21 is included on the connecting surface of section 26 to prevent attempts to overcome the locking mechanism by inserting tools into lock casing 3. As seen in FIG. 5A, lock casing 3 may also be formed as part of section 26, in which case lock casing coverplate 23 and coverplate screws 24 are used to close the locking mechanism after inserting central axis member 14, cylinder lock 4, spring member 10, and locking bolt 11 into it. Lock casing coverplate recess 22 is specially formed on the posterior surface of the anterior end of section 26 to allow lock casing coverplate 23 to be attached in a fully flush, secure, position.

Operation

The general operation of the device is best seen in FIGS. 1A and 1B. A person desiring to install the device on an automobile places it on steering wheel 1 in the fully open position, as shown in FIG. 1A. The person then rotates section 26 around section 30 until reaching the fully closed position shown in FIG. 1B, at which point the device is locked automatically when locking bolt 11 is forced into locking bolt insertion hole 15 by the decompression of spring member 10, as best seen in FIGS. 6A and 6B. Once locking bolt 11 is forced into locking bolt insertion hole 15, sections 26 and 30 are both fixedly joined to central axis member 14 and cannot be rotated or separated until an authorized key is inserted into cylinder lock 4 in order to unlock the device.

Extendable Interference Bar Member Embodiments

General Construction

As shown by FIG. 7A, the device may be configured to include an extendable interference bar member to further interfere with attempts to access the steering wheel. In this embodiment, the anterior end of sections 26 and 30 may be selectively perforated, as shown, since the free movement of the device on the steering wheel as an anti-theft method is augmented by the use of an interference bar member.

Figure 7B:
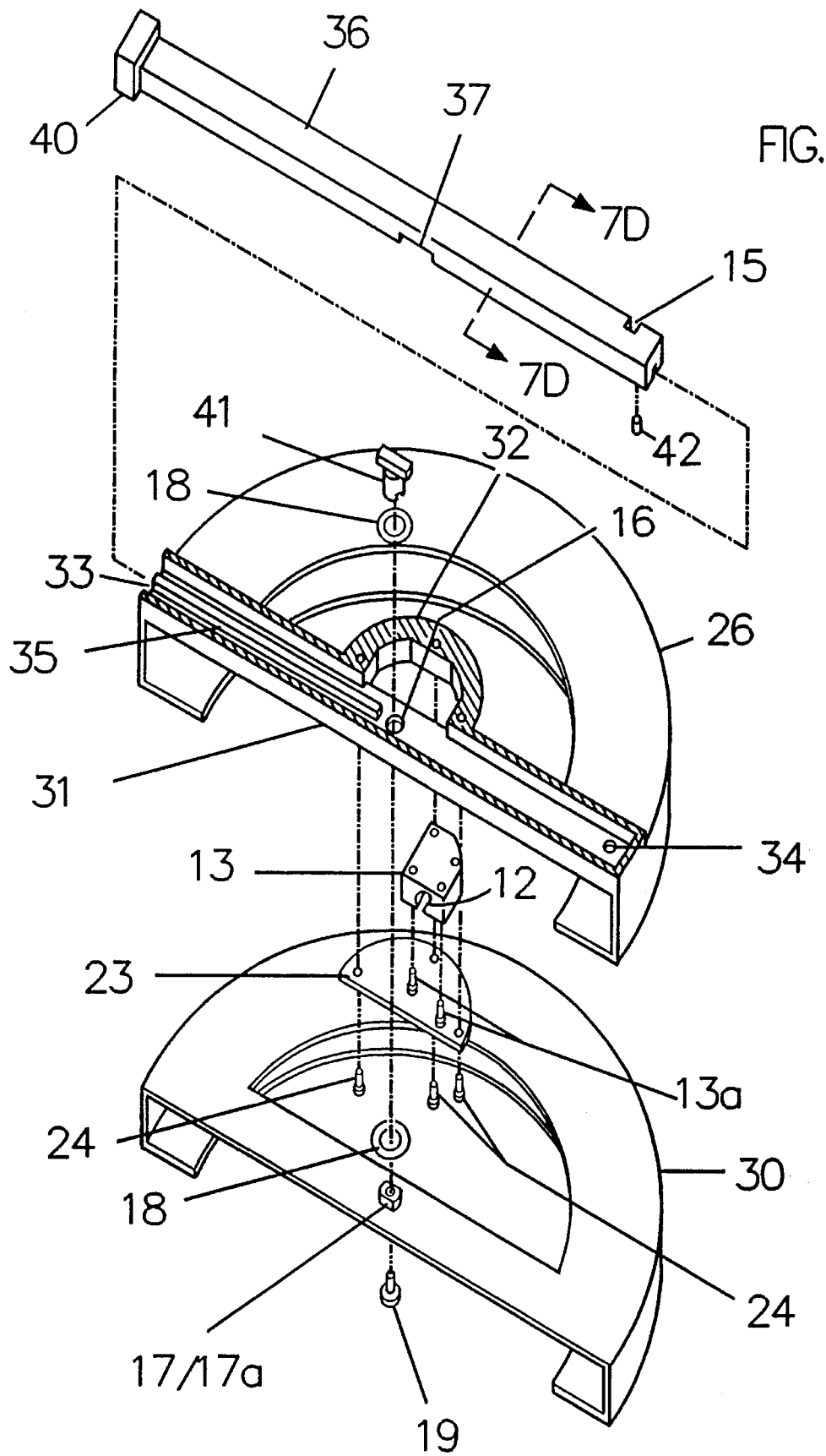
FIG. 7B is an exploded anterior isometric view of a two section device configured to include an extendable interference bar member.
Figure 7E:
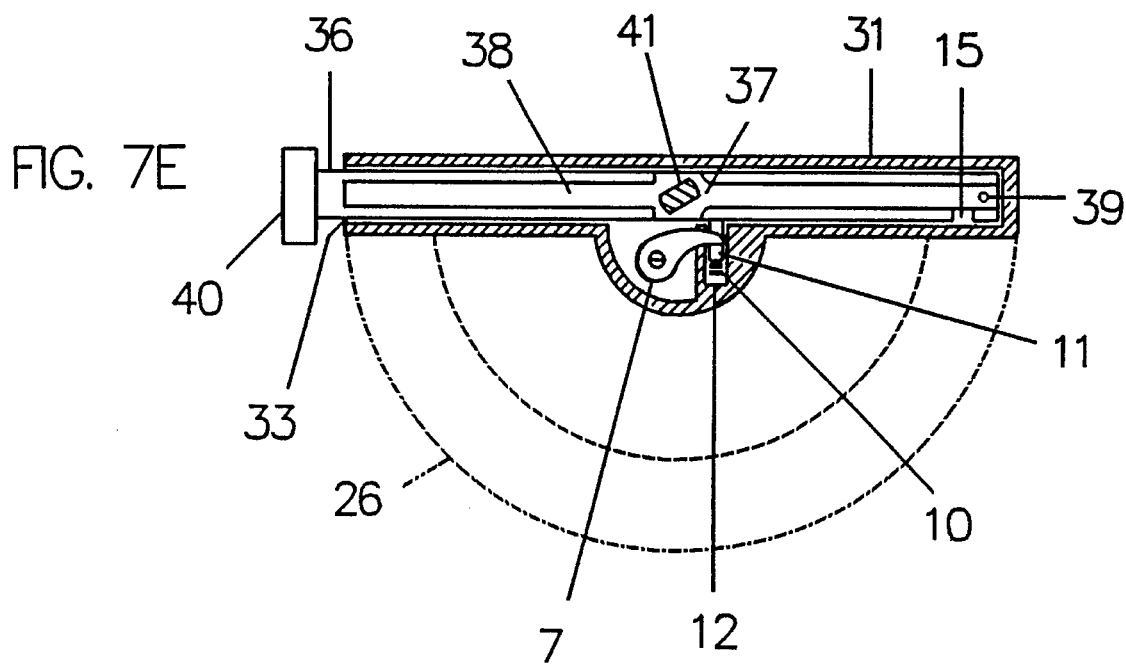
FIGS. 7E and 7F are posterior sectional views of the integral locking mechanism of an extendable interference bar member device.
Figure 8A:
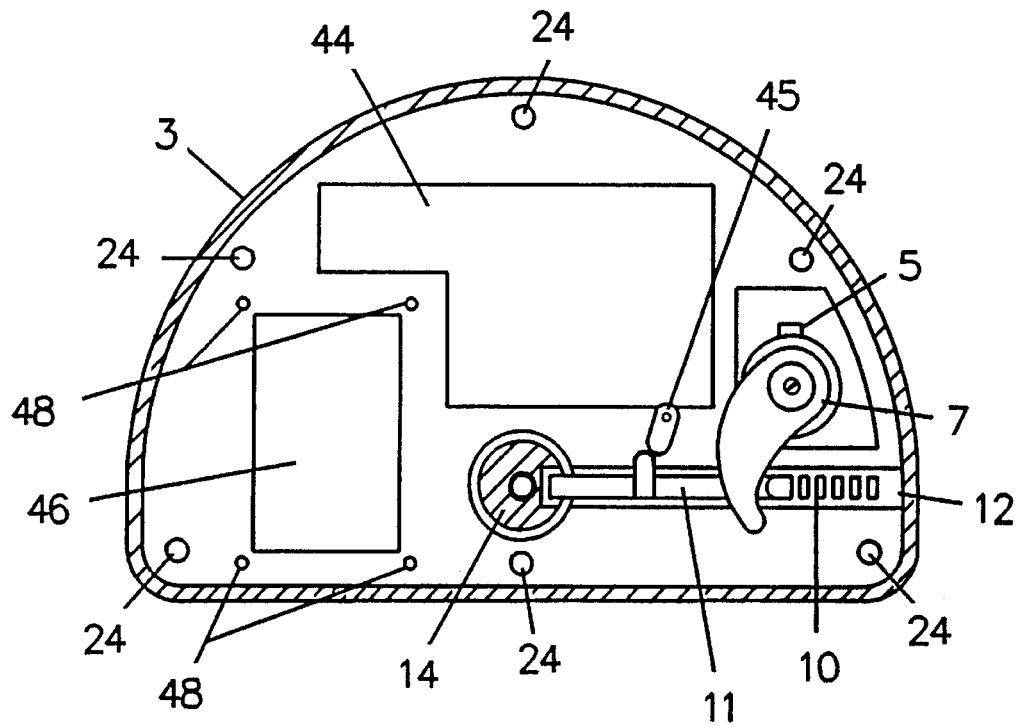
FIG. 8A is a posterior sectional view of a two section device configured to include a self-contained anti-theft alarm system.

As best shown by FIG. 7B, the particular embodiment shown by FIG. 7A includes an extendable interference bar guide tube 31 open at one end and an extendable interference bar member 36. Guide tube 31 includes a particularly extended cavity area 32 for containing the locking mechanism of the device, which includes cylinder lock 4, cam arm 7, and a locking bolt core 13 containing spring member 10, locking bolt 11 and locking bolt channel 12, all in the general configuration described under "Two Section Embodiments" above. In this particular embodiment, the sections are still joined together by attaching the male extension 17 of section 30 to a mated female shaft portion of a central axis member extending through central axis opening 16 included at the center point of section 26. As best seen in FIG. 7C, however, central axis member 14 is replaced by central axis member 41, which includes a particular rectangular head 41a and a female shaft 41b containing screw hole 41c (screw hole not shown). After sections 26 and 30 have been joined together—and a lock casing coverplate 23 has been installed as described under "Two Section Embodiments" above— cam arm 7 is rotated by inserting an authorized key into cylinder lock 4 in order to retract locking bolt 11 so that extendable interference bar member 36 may be inserted into guide tube 31 through insertion aperture 33, which is best seen in FIGS. 7A, 7B and 7E. Optional set screw 42 is then screwed into set screw hole 39 included in extendable interference bar member 36 for this purpose using access hole 34 provided for this purpose near the closed end of guide tube 31, as best seen in FIGS. 7B and 7E. Once set screw 42 has been attached to extendable interference bar member 36, it is no longer possible to remove extendable interference bar member 36 from guide tube 31 since the edge of set screw 42 contacts the rectangular head 41a of central axis member 41 when it is attempted to do so. Set screw access hole 34 is not accessible when the device is installed in a locked position on a steering wheel since section 30 covers it. Although the installation of set screw 42 is not critical to the operation of the device, it is advisable to insure that interference bar member 36 isn't inadvertently detached from guide tube 31 should the locking mechanism fail to function properly.

Operation

Figure 7F:
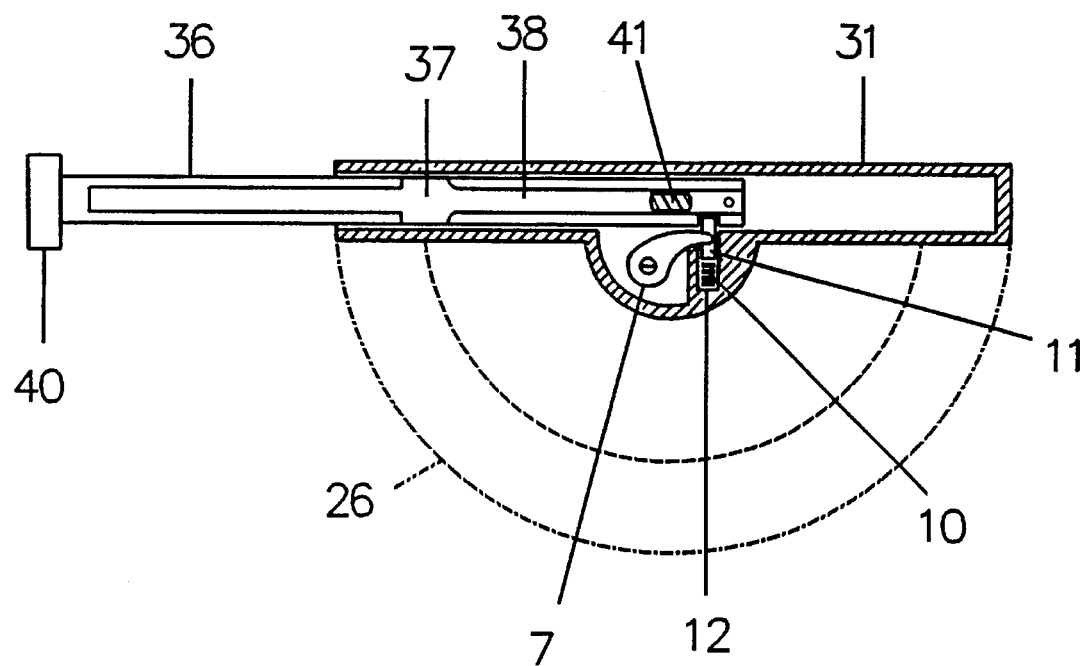

The operation of the device is generally the same as described above for "Two Section Embodiments". As previously described, section 26 is pivoted around section 30 on the axis member until the device encircles the steering wheel. In order to lock the device, however, the person installing it extends interference bar member 36 from within guide tube 31 by pulling on handle 40. After interference bar member 36 has been extended a preselected distance, the device locks automatically, as best seen in FIGS. 7E and 7F.

The detailed locking mechanism is as follows: The rotation of section 26 around section 30 is only made possible by free rotation groove 37 included in extendable interference bar member 36, which allows extendable interference bar member 36 to be freely rotated around central axis member 41 until extendable interference bar member 36 is extended. Extendable interference bar member 36 can only be extended when sections 26 and 30 are in their completely open or completely closed positions since it cannot be slid within guide tube 31 until the longest side of the particularly positioned rectangular head 41a of central axis member 41 is completely parallel with anti-rotation groove 38, which then allows the shortest side of rectangular head 41a to fit into anti-rotation groove 38. FIG. 7D provides an end sectional view of extendable interference bar member 36 showing anti-rotation groove 38. As soon as extendable interference bar member 36 undergoes extension, sections 26 and 30 can no longer be rotated since the rectangular head 41a of central axis member 41 immediately contacts the walls of anti-rotation groove 38 when it is attempted to do so. Once extendable interference bar member 36 has been extended a preselected distance, locking bolt 11 is forced into locking bolt insertion hole 15 particularly located on extendable interference bar member 36 for this purpose by the decompression of spring member 10, fixing extendable interference bar member 36 in place and locking the device on the steering wheel since the further rotation of sections 26 and 30 is no longer possible. Although not critical to the operation of the device, anti-rotation tongue 35 is included within guide tube 31 to prevent the insertion of prying bars or other tools into the anti-rotation groove of the device and as a means to help align, stabilize and strengthen the fit of central axis member 41 within anti-rotation groove 38 of extendable interference bar member 36, as best seen in FIG. 7B.

Two-Piece Extendable Interference Bar Members

Figure 7G:
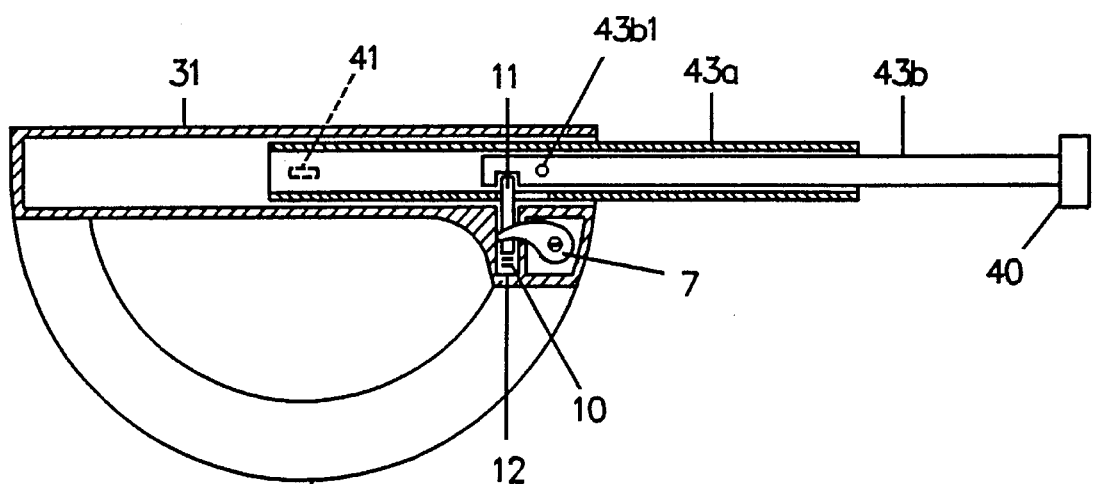
FIG. 7G is an anterior sectional view of a two section device configured to include a two-piece extendable interference bar member.
Figure 7H:
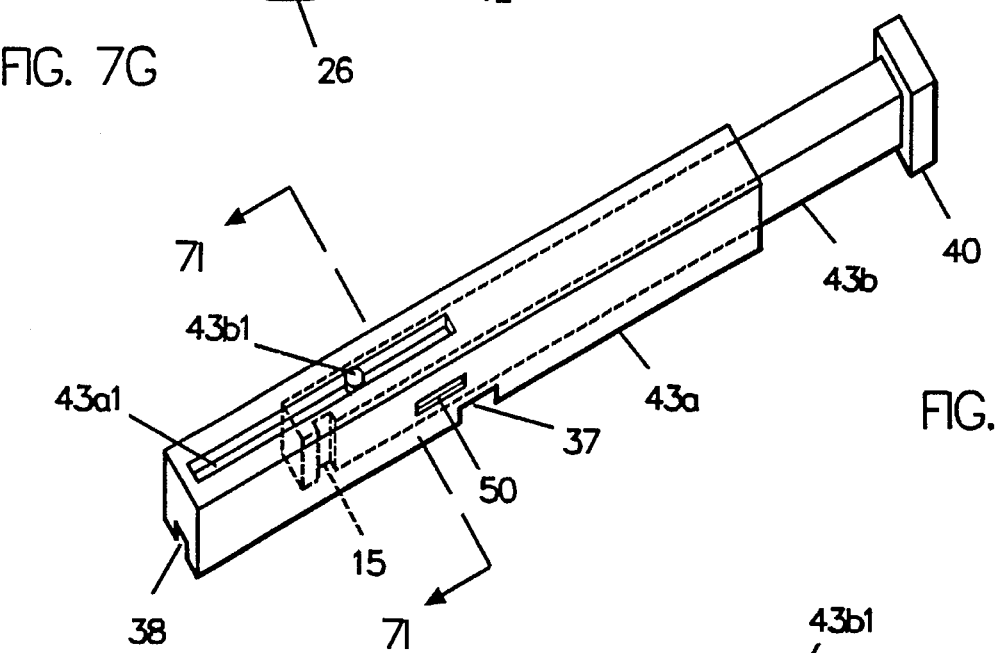
FIG. 7H is an isometric view of a two-piece extendable interference bar member.
Figure 7I:
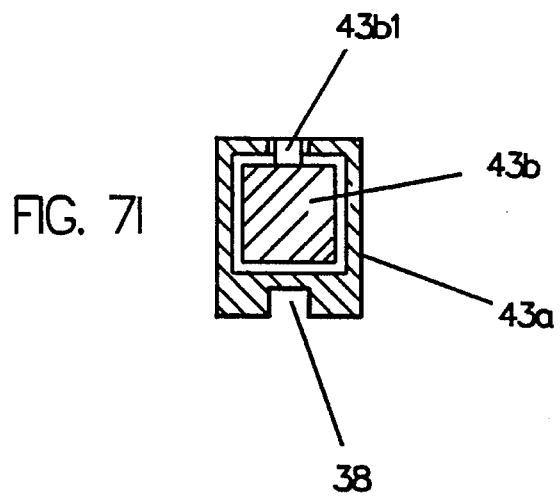
FIG. 7I is an end sectional view of a two-piece extendable interference bar member.

As shown by FIGS. 7G to 7I, the extended length of the extendable interference bar may be approximately doubled using a two-piece configuration consisting of an outer (tubular) bar member 43a containing an inner bar member 43b. The construction and operation of this particular embodiment is exactly as described above for the basic extendable interference bar configuration except as follows: At first, as the person installing the device pulls on handle 40 to extend the interference bar member, only inner bar member 43b is extended. Then—once inner bar member 43b reaches a predetermined extension point—extension screw 43b1 attached to inner bar member 43b makes contact with the end of extension screw course 43a1 included for this purpose as part of tubular outer bar member 43a, causing both bar members to be extended until locking bolt 11 is driven through locking bolt insertion passage 50 and into locking bolt insertion hole 15 by the decompression of spring member 10, thereby locking the device as shown.

Anti-Theft Alarm System

Figure 8B:
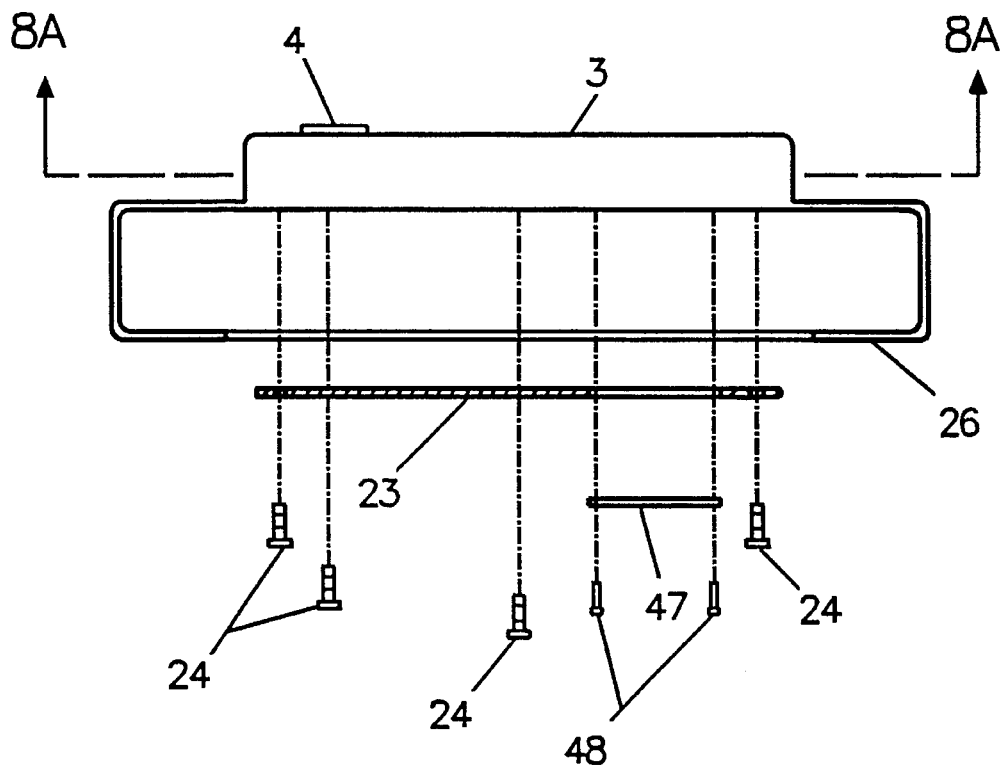
FIG. 8B is an exploded elevation/section view showing the battery case coverplate configuration associated with an anti-theft alarm system.

As shown by FIG. 8A, lock casing 3 may additionally include a low voltage anti-theft alarm system powered by a self-contained electrical source without altering the fundamental embodiment or operation of the device. By both drawing unwanted attention to criminal activity and creating a substantial physical constraint to theft, this particular embodiment presents a formidable obstacle to the would be thief. Using existing alarm technology, a 110 decibel or greater audio alarm can be installed and set to be activated under one or more predetermined conditions, including, by way of example only, attempts to tamper with the device itself or by monitoring the tilt angle of the device to detect any attempt to tow the vehicle. By way of explanation, the particular embodiment shown by FIG. 8A includes: an alarm module 44 containing alarm monitoring circuity, an audio annunciator, a flashing LED armed condition indicator and an RF receiver; and, an On/Off switch 45. Electrical power sufficient to operate the alarm system for an extended period is provided by a 9-volt power source 46 containing a plurality of batteries. As shown by FIG. 8B, a battery case coverplate 47 and coverplate screws 48 provide a secure means for storing and renewing batteries since battery case coverplate 47 is inaccessibly located on the posterior—or steering wheel hub facing—side of lock casing 3 when the device is installed on a steering wheel. The anti-theft alarm may be switched on and off by a remote control RF transmitter (not shown) acting on the RF receiver included in alarm module 44 or by an operable connection of On/Off switch 45 to locking bolt 11. In this instance, locking bolt 11 is altered to include a particular extended portion acting on ON/OFF switch 45 so that: a) On/Off switch 45 is switched on by the movement of locking bolt 11 as locking bolt 11 is being urged into locking bolt insertion hole 15 by the decompression of spring member 10 to lock the device; and, b) On/Off switch 45 is switched off when locking bolt 11 is retracted back into locking bolt channel 12 by the force of cam arm 7 to unlock the device, as best shown by FIG. 8A.

Figure 8C:
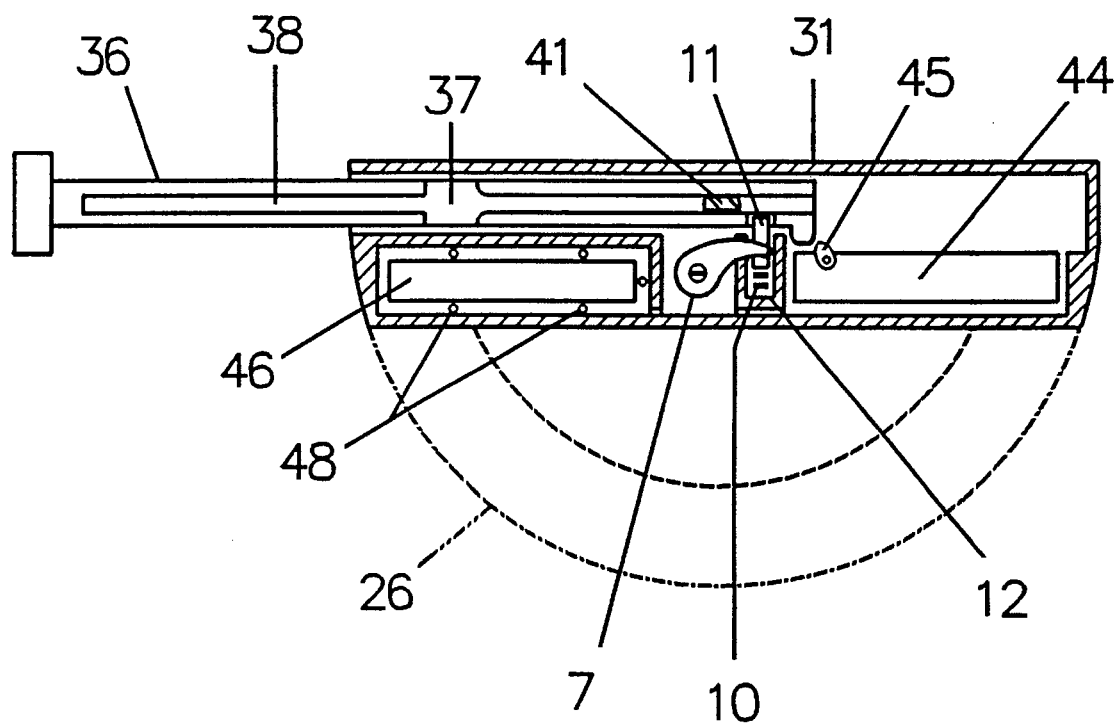
FIG. 8C is a posterior sectional view of a two section device configured to include both an anti-theft alarm system and an extendable interference bar member.

As shown by FIG. 8C, the anti-theft alarm system may be embodied concurrently with an extendable interference bar member 36. In this configuration, one end of interference bar member 36 is modified to include a particular extended portion acting on ON/OFF switch 45 so that a) On/Off switch 45 is switched on by the movement of bar member 36 as it is being extended; and, b) On/Off switch 45 is switched off by the movement of bar member 36 as it is being retracted. Interference bar guide tube 31 is modified to contain a 9 volt battery case 46 and alarm module 44 as shown. The construction and operation of the physical locking mechanism of the device remains as described under "Extendable Interference Bar Member Embodiments", above.

Four Section Embodiments

General Construction

As noted previously, the storage size of the device may be decreased by increasing the number of sections utilized in its construction while simultaneously decreasing the sector size of each section. FIG. 9 shows an exploded isometric view of a four section device composed of sections 26, 28, 29 and 30 sharing a common central axis. As described previously, each section is particularly dimensioned so that section 28 is rotatable within the cross sectional area described by section 26; section 29 is rotatable within the area described by section 28; and, section 30 is rotatable within the area described by section 29. This rotational arrangement allows the sections to nest inside one another when the device is not in use, which substantially decreases its size for storage purposes, as best seen in FIG. 10A. Because the construction and operation of four section embodiments is substantially the same as described earlier under "Two Section Embodiments", only those features unique to four section embodiments are explained below:

Leading Edge 27 Extension

As best seen in FIG. 9, leading edge 27 where section 26 meets the straight linear edge of section 30 when the device is in the locked position, includes a perpendicular extension along its entire contour so that a close engagement is maintained between these two sections even though the general contour of section 26 is several dimensions larger than that of section 30. This extension is recommended to help prevent the insertion of tools between the subject edges in an attempt to overcome the device or reach the steering wheel rim. No other edge extensions apply because all other adjacent edges are shared between sections of immediate dimensioned contour.

Tubular Hub Segments and Central Axis Member

Figure 11:
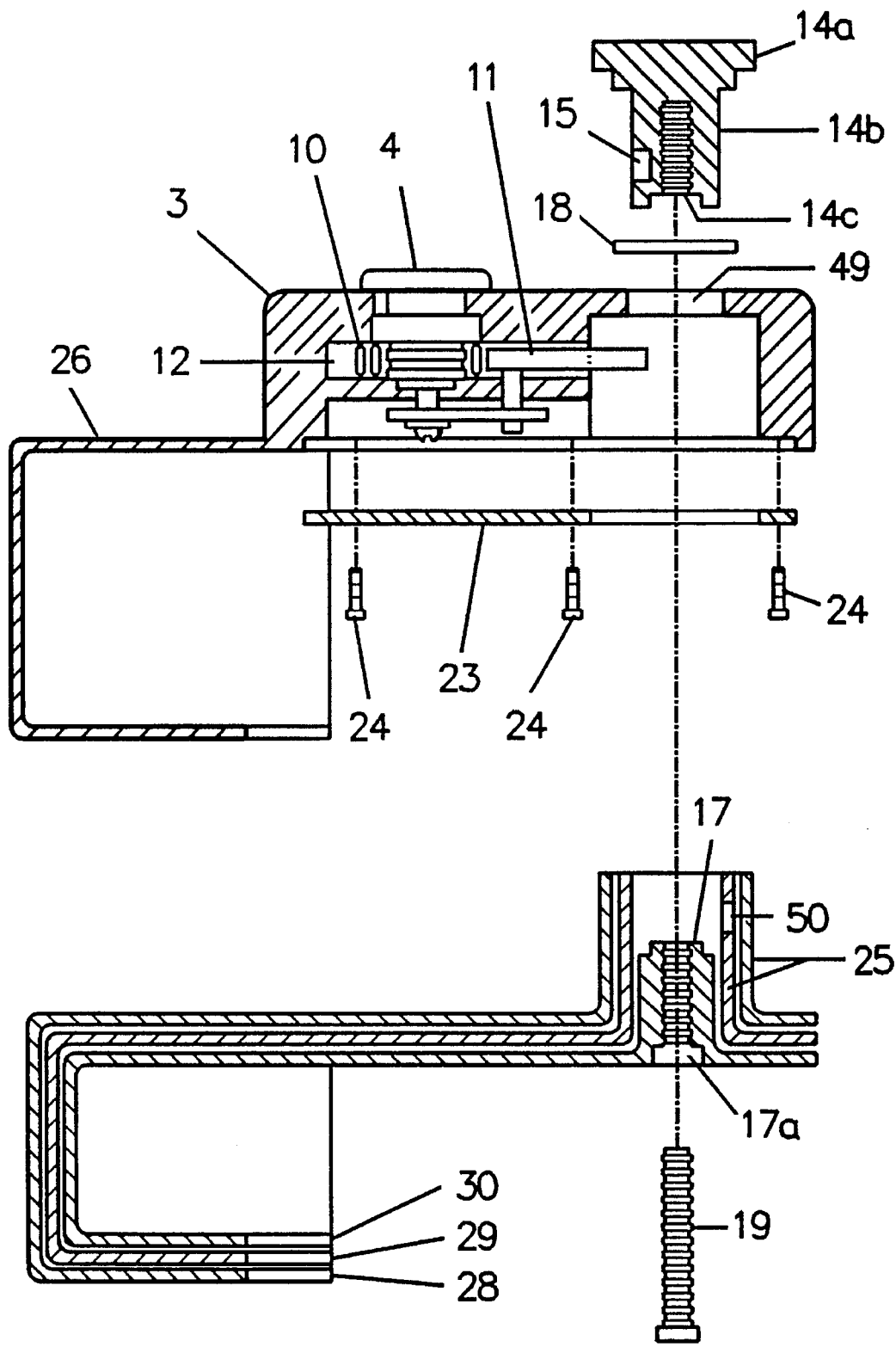
FIG. 11 is a side sectional view of the central axis configuration for a four section device.
Figure 12A:
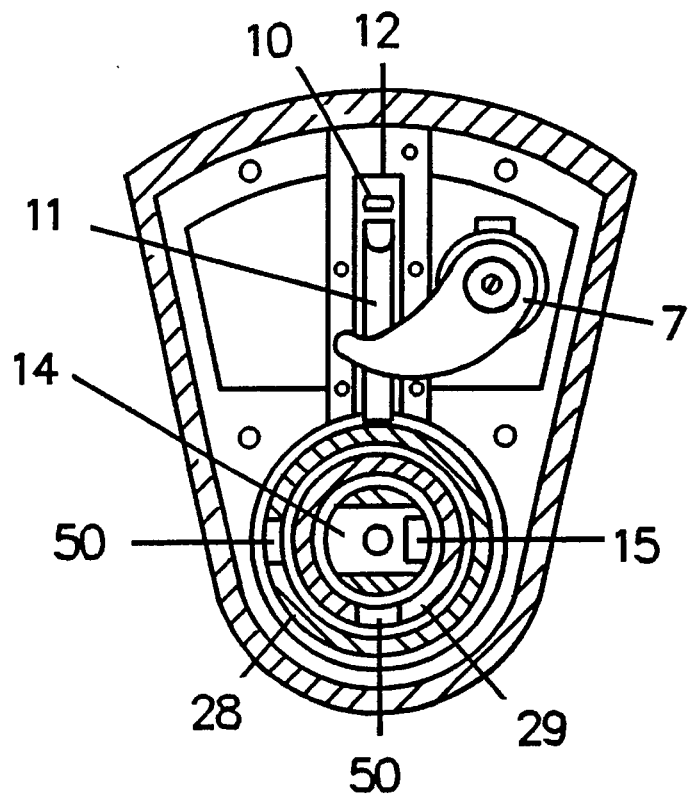
FIGS. 12A to 12D are posterior sectional views of the integral locking mechanism of a four section device.
Figure 12B:
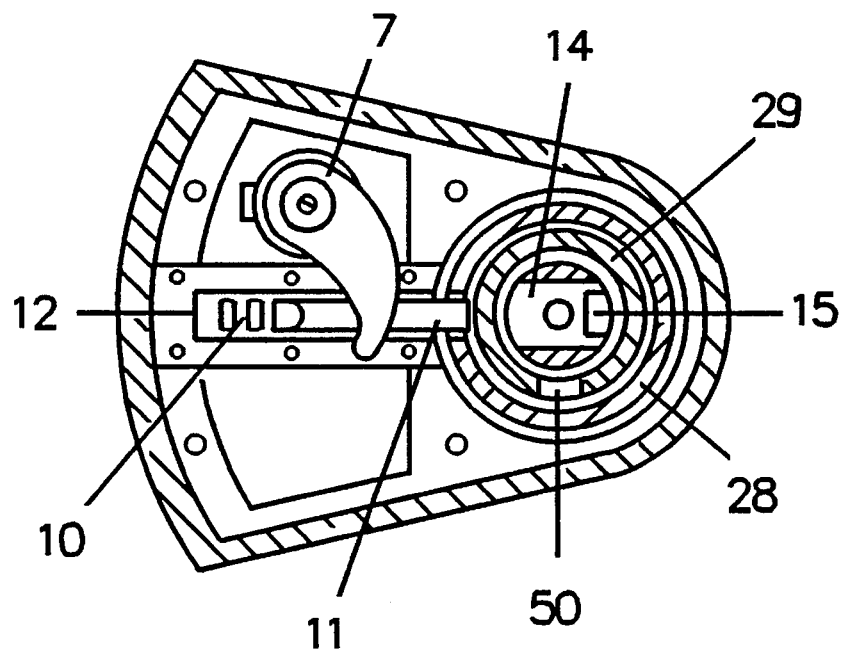
Figure 12C:
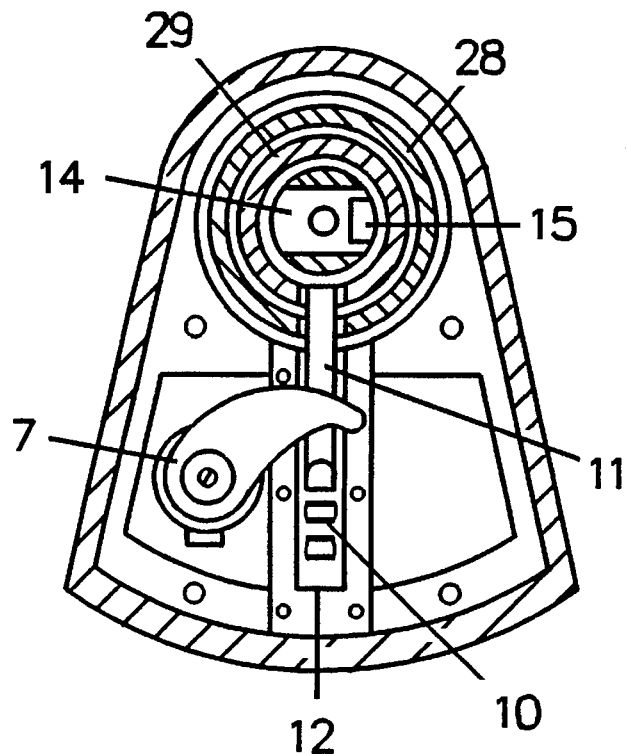
Figure 12D:
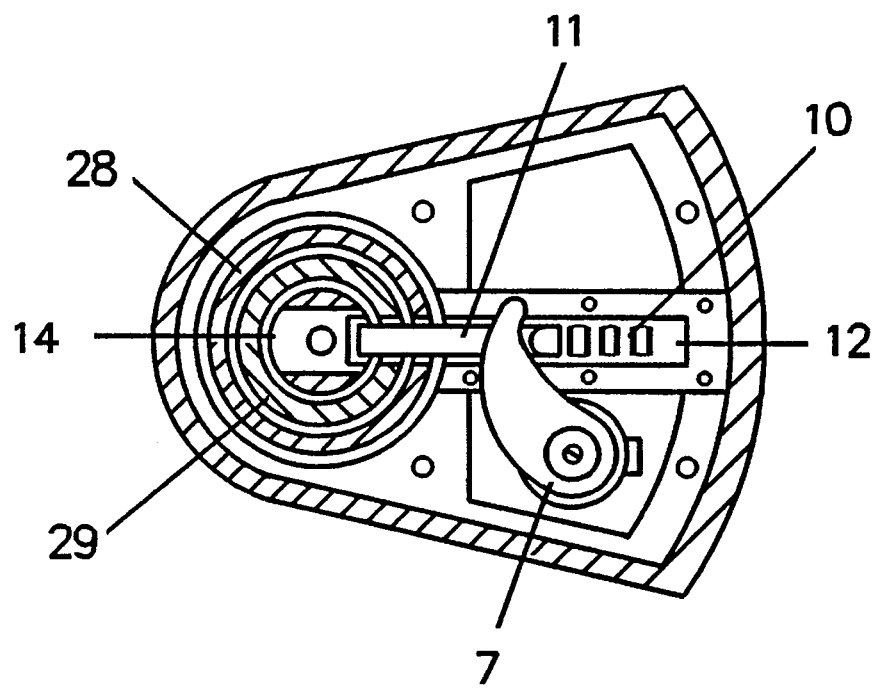

As best seen in FIG. 9, the center points of sections 28 and 29 are modified to include particularly dimensioned tubular hub segments 25, each of which contains a single locking bolt insertion passage 50. As best seen in FIG. 11, central axis member 14 is modified by reducing the length of circular head 14a and increasing the length of female shaft 14b so that it may be inserted entirely through lock casing 3 and the anterior end of section 26 using central axis opening 49 located on the anterior, or top, side of lock casing 3. After central axis member 14 has been inserted into lock casing 3, the tubular hub segments of sections 28 and 29, in order, are slid onto female shaft 14b and the assembly of the sections of the device is completed by fixedly joining the male extension 17 of section 30 to the mated female portion of shaft 14b using axis screw 19. Washers 18 are optionally included along shaft 14b between circular head 14a and the adjoining surface of lock casing 3 and between the tubular hub segments of each adjoining section to minimize binding during rotational movement.

Operation

Figure 10D:
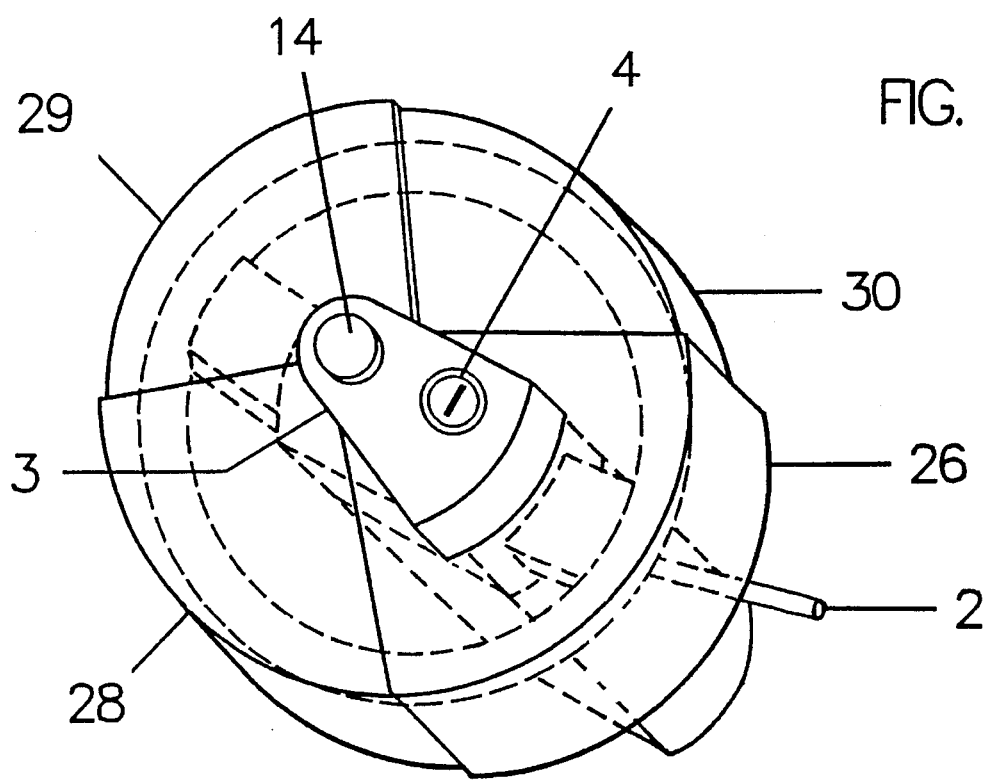

The general operation of the device is best seen in FIGS. 10A to 10D. A person desiring to install the device on an automobile places it on steering wheel 1 in the fully open position shown in FIG. 10A. The person then rotates section 26 around the steering wheel until the device automatically locks when the fully closed position shown in FIG. 10D is reached. The detailed operation of the device is as follows: As section 26 is rotated around the steering wheel, locking bolt 11 is sequentially urged by the decompression of spring member 10 into and through the locking bolt insertion passages 50 particularly located on the tubular hub segments 25 of sections 28 and 29 so that, first, section 28 is joined to and pulled behind section 26 as it is rotated around the steering wheel and, second, section 29 is joined to and pulled behind sections 26 and 28 as they are rotated around the steering wheel. The device locks automatically when locking bolt 11 is driven into a locking bolt insertion hole 15 particularly located on shaft 14b of central axis member 14 by the continued decompression of spring member 10 when sections 26, 28 and 29 have been rotated to their closed position in relation to section 30. The sequential urging of locking bolt 11 into locking bolt insertion passages 50 and locking bolt insertion hole 15 is illustrated by FIGS. 12A to 12D, which directly correspond to the positions of closure shown for the device in FIGS. 10A to 10D.

The locking mechanism of the four section embodiment detailed herein continues to utilize cylinder lock 4, cam arm 7, spring member 10, locking bolt 11, and locking bolt channel 12, as explained previously under "Two Section Embodiments."

SUMMARY, RAMIFICATIONS AND SCOPE

Although the description above provides several examples of preferred embodiments of the invention, those skilled in the art will recognize that other and further changes may be made thereto without departing from the spirit of the invention, and it is intended to claim such changes and modifications as fall within the true scope of the invention as defined by the appended claims and their legal equivalents, rather than by the examples given.

Having thus described my invention, I claim:

1. A portable housing device for temporary installation on the steering wheel of a parked vehicle to prevent theft, comprising:

(a) a plurality of sections, each section for enclosing a particular portion of the steering wheel;

(b) an axis member fixedly comprised by one of the sections, the axis member being particularly modified to serve as a pivot point around which each remaining section is rotated as a means for installing the device on the steering wheel and removing it therefrom;

(c) a locking means for fixedly joining the sections together so that no section may then be rotated, the locking means employing engagement with the axis member, and (d) the axis member, comprising a particularly modified portion for engagement with the locking means.

2. A device according to claim 1 having two sections, including one section rotatably connected to the axis member, wherein the locking means comprises:

(a) a casing comprised by the rotatably connected section, the casing having a hollow portion enclosing the axis member;

(b) a locking bolt having an extended segment between its opposite ends, the locking bolt mounted for sole longitudinal reciprocating movement within the casing so that one end of the locking bolt may be extended into the hollow portion to act on the axis member;

(c) the axis member having a particular passageway into which the locking bolt may be inserted as a means for fixedly joining the rotatably connected section comprising the casing to the axis member;

(d) a spring member mounted under compression at one end of the locking bolt within the casing as a means for forcibly urging the opposite end of the locking bolt into the passageway comprised by the axis member;

(e) a cam arm mounted for rotational movement within the casing so that it acts on the extended segment of the locking bolt as a means for retracting the locking bolt from the passageway comprised by the axis member; and (f) means for rotating the cam arm to cause it to act on the extended segment of the locking bolt.

3. A device according to claim 2, wherein the means for rotating the cam arm comprises a cylinder lock mounted so that it is operably connected to the cam arm within the casing.

4. A portable housing device having an anterior end, a posterior end, and a circumferential side defining an interior portion of a size and a shape suitable for enclosing the steering wheel of a parked motor vehicle to prevent auto and airbag theft, comprising:

(a) a plurality of sections, each section comprising a particular portion of the ends and the side of the device;

(b) an axis member fixedly comprised by one of the sections at a substantially perpendicular angle to the anterior end thereof, the axis member being particularly modified to serve as a pivot point around which each remaining section is rotated as a means for installing the device on the steering wheel and removing it therefrom;

(c) a locking means for fixedly joining the sections together so that no section may then be rotated, the locking means employing engagement with the axis member; and (d) the axis member, comprising a particularly modified portion for engagement with the locking means.

5. A device according to claim 4 having three or more sections, including two or more sections rotatably connected to the axis member, wherein the locking means comprises:

(a) a casing comprised by one of the rotatably connected sections, the casing having a hollow portion enclosing the axis member and the rotatable connection to the axis member of each remaining rotatably connected section;

(b) a locking bolt having an extended segment between its opposite ends, the locking bolt mounted for sole longitudinal reciprocating movement within the casing so that one end of the locking bolt may be extended into the hollow portion to act on the axis member and the rotatable connection to the axis member of each remaining rotatably connected section;

(c) the axis member having a particular passageway into which the locking bolt may be inserted as a means for fixedly joining the rotatably connected section comprising the casing to the axis member;

(d) the rotatable connection to the axis member of each remaining rotatably connected section, comprising a tubular hub segment having a particular passageway through which the locking bolt may be inserted as a means for fixedly joining each remaining rotatably connected section to the axis member;

(e) a spring member mounted under compression at one end of the locking bolt within the casing as a means for forcibly urging the opposite end of the locking bolt into the passageways comprised by each tubular hub segment and the axis member;

(f) a cam arm mounted for rotational movement within the casing so that it acts on the extended segment of the locking bolt as a means for retracting the locking bolt from the passageways comprised by the each tubular hub segment and the axis member; and (g) means for rotating the cam arm to cause it to act on the extended segment of the locking bolt.

6. A device according to claim 5, wherein the means for rotating the cam arm comprises a cylinder lock mounted so that it is operably connected to the cam arm within the casing.

7. A portable security device for temporary installation on the steering wheel of a vehicle to prevent theft, comprising:

(a) a plurality of rotatably connected sections forming a housing having an anterior end, a posterior end, and a circumferential side defining an interior portion of a size and a shape suitable for enclosing a particular portion of the steering wheel;

(b) an axis member fixedly comprised by one of the sections, the axis member being particularly modified to serve as a pivot point around which each remaining section is rotated as a means for installing the device on the steering wheel and removing it therefrom;

(c) a locking means for fixedly joining the sections together so that no section may then be rotated, the locking means employing engagement with the axis member; and (d) the axis member, comprising a particularly modified portion for engagement with the locking means.

8. A device according to claim 7, wherein the locking means comprises an interference bar member suitable to impede rotation of the steering wheel by making contact with the surrounding vehicle structure.

9. A device according to claim 8 having two sections, including one section rotatably connected to the axis member, wherein the locking means comprises:
   (a) a casing comprised by the rotatably connected section, the casing having a longitudinal hollow portion enclosing the axis member and one end and the midsection of the interference bar member;
   (b) the casing having a particular opening at one end of the longitudinal hollow portion through which the other end of the interference bar member emerges;
   (c) the interference bar member mounted for sole reciprocating movement within the longitudinal hollow portion so that the midsection of the interference bar member may be extended through the opening comprised at one end thereof;
   (d) an engagement means for fixedly joining the rotatably connected section to the particularly modified portion of the axis member concurrent with the extension of the interference bar member from within the casing; and
   (e) means for fixedly attaching the interference bar member to the casing after a particular portion of the midsection of the interference bar member has been extended therefrom.

10. A device according to claim 9 wherein the engagement means for fixedly joining the rotatably connected section to the axis member concurrent with the extension of the interference bar member comprises:
   (a) the axis member having a particular end portion acted on by the interference bar member; and
   (b) the interference bar member having a particular recessed portion configured to engage with the end portion of the axis member when the interference bar member is extended.

11. A device according to claim 10 wherein the means for fixedly attaching the interference bar member to the using comprises:
   (a) a locking bolt having an extended segment between its opposite ends, the locking bolt mounted for sole longitudinal reciprocating movement within the casing so that one end of the locking bolt may be extended into the hollow portion to act on the interference bar member;
   (b) the interference bar member having a particular passageway into which the locking bolt may be inserted as a means for fixedly attaching the interference bar member to the casing;
   (c) a spring member mounted under compression at one end of the locking bolt within the casing as a means for forcibly urging the opposite end of the locking bolt into the passageway comprised by the interference bar member;
   (d) a cam arm mounted for rotational movement within the casing so that it acts on the extended segment of the locking bolt as a means for retracting the locking bolt from the passageway comprised by the interference bar member; and
   (e) means for rotating the cam arm to cause it to act on the extended segment of the locking bolt.

12. A device according to claim 11 wherein the means for rotating the cam arm comprises a cylinder lock mounted so that it is operably connected to the cam arm within the casing.

* * * * *